(12) United States Patent
Ohmori et al.

(10) Patent No.: US 7,831,831 B2
(45) Date of Patent: Nov. 9, 2010

(54) AUTHENTICATION COMMUNICATION SYSTEM, AUTHENTICATION COMMUNICATION APPARATUS, AND AUTHENTICATION COMMUNICATION METHOD

(75) Inventors: Motoji Ohmori, Hirakata (JP);
Toshihisa Nakano, Neyagawa (JP);
Takahiro Nagai, Osaka (JP); Hideshi Ishihara, Katano (JP); Makoto Tatebayashi, Takarazuka (JP)

(73) Assignee: Panasonic Corporation, Osaka (JP)

( * ) Notice: Subject to any disclaimer, the term of this patent is extended or adjusted under 35 U.S.C. 154(b) by 951 days.

(21) Appl. No.: 10/431,502

(22) Filed: May 8, 2003

(65) Prior Publication Data
US 2004/0003239 A1    Jan. 1, 2004

(30) Foreign Application Priority Data
May 9, 2002    (JP)    ............................. 2002-134648

(51) Int. Cl.
*H04L 9/32*    (2006.01)
(52) U.S. Cl. ...................................... 713/175; 713/158
(58) Field of Classification Search ......... 380/200–202, 380/228–232; 713/175, 156, 158, 193, 155, 713/168–170; 726/26–33; 705/57, 51, 50, 705/59
See application file for complete search history.

(56) References Cited

U.S. PATENT DOCUMENTS

| 5,502,765 | A | * | 3/1996 | Ishiguro et al. | ............... | 705/67 |
| 5,949,877 | A | | 9/1999 | Traw et al. | | |
| 5,970,405 | A | * | 10/1999 | Kaplan et al. | ............... | 455/410 |
| 6,092,201 | A | * | 7/2000 | Turnbull et al. | ................ | 726/4 |
| 6,128,740 | A | * | 10/2000 | Curry et al. | .................. | 713/158 |
| 6,134,551 | A | * | 10/2000 | Aucsmith | ...................... | 707/10 |
| 6,397,329 | B1 | * | 5/2002 | Aiello et al. | ................. | 713/155 |
| 6,581,160 | B1 | * | 6/2003 | Harada et al. | ............... | 713/169 |
| 6,993,135 | B2 | * | 1/2006 | Ishibashi | ..................... | 380/277 |
| 6,999,587 | B1 | * | 2/2006 | Asano et al. | ................. | 380/202 |
| 7,085,929 | B1 | * | 8/2006 | Staring | ........................ | 713/168 |
| 7,260,715 | B1 | * | 8/2007 | Pasieka | ....................... | 713/158 |
| 2002/0034302 | A1 | | 3/2002 | Moriai et al. | | |
| 2002/0035492 | A1 | * | 3/2002 | Nonaka | ......................... | 705/5 |

(Continued)

FOREIGN PATENT DOCUMENTS

EP    0 930 556 A2    7/1999

(Continued)

OTHER PUBLICATIONS

Warwick Ford, Michael Baum, Secure Electronic Commerce, 1997, Prentice Hall, Section 6.1, pp. 194-196, Section 6.4, pp. 211-214, Section 6.6, pp. 230-239.

(Continued)

*Primary Examiner*—Nirav Patel
(74) *Attorney, Agent, or Firm*—Wenderoth, Lind & Ponack, L.L.P.

(57) ABSTRACT

An authentication communication system is capable of storing information relating to revoked devices in less area than is conventionally required.

A computer unit stores in advance revocation information that indicates at least one revoked apparatus, and when authenticating a driver unit judges, based on the revocation information, whether or not the driver unit is revoked. The computer unit prohibits communication with the driver unit when the driver unit is judged to be revoked, and communicates with the driver unit when the driver unit is judged not to be revoked.

23 Claims, 19 Drawing Sheets

U.S. PATENT DOCUMENTS

| | | |
|---|---|---|
| 2002/0046337 A1 | 4/2002 | Micali |
| 2002/0108041 A1* | 8/2002 | Watanabe et al. ............ 713/175 |
| 2003/0046536 A1* | 3/2003 | Bruekers et al. ............. 713/158 |
| 2003/0097566 A1* | 5/2003 | Kumagai et al. ............. 713/175 |
| 2005/0021941 A1* | 1/2005 | Ohmori et al. .............. 713/156 |

FOREIGN PATENT DOCUMENTS

| | | |
|---|---|---|
| JP | 59-231650 | 12/1984 |
| JP | 2000-339274 | 12/2000 |
| JP | 2001-042769 | 2/2001 |
| JP | 2001-351322 | 12/2001 |
| WO | 03/088565 | 10/2003 |

OTHER PUBLICATIONS

Warwick Ford and Michael S. Baum, "Secure Electronic Commerce: Building the Infrastructure for Digital Signatures and Encryption, Second Edition", Pearson Education Japan, 2001, pp. 1-14, w/partial translation.

* cited by examiner

FIG. 2

COMPUTER UNIT PUBLICKEY CERTIFICATE Cert-H   332

| COMPUTER UNIT IDENTIFIER ID-H |
|---|
| COMPUTER UNIT PUBLIC KEY PK-H |
| CA SIGNATURE DATA FOR PUBLIC KEY PK-H |
| VALIDITY PERIOD 2005.1.1~2006.12.31 |
| ⋮ |

FIG. 3

DRIVER UNIT PUBLIC KEY CERTIFICATE Cert-D  232

| DRIVER UNIT IDENTIFIER ID-D |
| DRIVER UNIT PUBLIC KEY PK-D |
| CA SIGNATURE DATA FOR PUBLIC KEY PK-D |
| VALIDITY PERIOD  2005.1.1~2006.12.31 |
| ⋮ |

FIG.4

| DRIVER REVOCATION LIST CRL-D | | |
|---|---|---|
| FIELD HEADER | FILE NAME | A1234.crl |
| | SIZE | 79KB |
| | TYPE | CERTIFICATE REVOCATION LIST |
| GENERAL | THIS UPDATE | 2002/05/10/19:00 |
| | VERSION | V1 |
| | ISSUER | ABCD |
| | VALIDITY START DATE | 2002.05.10 |
| | NEXT UPDATE | 2002.05.25 |
| | SIGNATURE ALGORITHM | SHA-1 ELLIPTIC CURVE |
| REVOCATION LIST | SERIAL NUMBER | REVOCATION DATE |
| | ABC12345 | 2002.03.18 |
| | XYZ12346 | 2001.11.25 |
| | ... | ... |

APPARATUS IDENTIFIER LIST ⤴ 231b

| IDENTIFIER | VALIDITY DISTINCTION INFORMATION |
|---|---|
| ABC123 | VALID |
| XYZ456 | REVOKED |
| ⋮ | ⋮ |

FIG. 19

DRIVER IDENTIFIER LIST  331b

| IDENTIFIER | VALIDITY DISTINCTION INFORMATION |
|---|---|
| A392XYZ | VALID |
| PWB892 | VALID |
| TH17VD | REVOKED |
| ⋮ | ⋮ |

AUTHENTICATION COMMUNICATION SYSTEM, AUTHENTICATION COMMUNICATION APPARATUS, AND AUTHENTICATION COMMUNICATION METHOD

BACKGROUND OF THE INVENTION (1) Field of the Invention

The present invention relates to an authentication communication technique for authenticating the legality of an opposite party before beginning communication.

(2) Related Art

The rapid spread of digital techniques in recent years has seen an increase in systems in which video content is digitized and provided to users, recorded on large capacity digital devices such as optical disks.

The fact that copies of digitized content do not exhibit deterioration in quality means that in order to protect the copyright of the digital content it is necessary to prevent unauthorized copying by a party holding the content. To this purpose, a device that transmits the content and a device that receives and plays back the content first confirm each other as being a device that protects copyrights before distributing the content. This enables devices which use the content to be limited to legal devices, and consequently protects the copyright of the content.

In this way, it is essential for a digital content processing device that receives, records or plays back digital content to confirm that a device with which communication is being performed (hereinafter referred to as an "opposite party") is a legal participant in the system. Such confirmation is called authentication. Authentication of the opposite party is called device authentication. Note that "certify" denotes a device showing that it is legal, in other words that the device is a legal participant in the system, and "validate" denotes confirming the legality of the opposite party. The concept of authentication includes both certification and validation.

An encryption technique is usually used in device authentication. Specifically, the certifying party has secret data showing that it is a legal participant in the system, and certifies its legality by showing the validating party that it (the certifying party) has the secret data. On the other hand, the validating party validates the legitimacy of the certifying party by confirming that the certifying party has the secret data. In a communication path, such as between a PC (personal computer) and peripheral devices, by which anyone can obtain communication data, it is imperative that secret data (authentication data) used in the above-described authentication is not leaked to a third party that is not associated with the authentication. This is because if the secret data is leaked to a third party, the device that has obtained the secret data can masquerade as the original device. For this reason, authentication data is transmitted in an encrypted state, only to the verifying party.

Types of encryption techniques include a common key encryption technique and a public key encryption technique. In the common key encryption technique the key for encryption and the key for decryption have the same value. On the other hand, in the public key encryption technique the key for encryption and the key for decryption have different values.

The fact that the validating party has the same secret as the certifying party for authentication in the common key encryption technique means that there is a danger that the verifying party may masquerade as the certifying party. The so-called password method is equivalent to this technique. On the other hand, in authentication in the public key encryption technique the certifying party certifies using a public key encryption technique secret key, and the verifying party verifies using a public key that corresponds to the secret key. Since the secret key cannot be made from the public key, the verifying party is unable to masquerade as the certifying party after authentication has finished. Consequently, the public key encryption method is preferable for performing the above-described authentication.

Note that in authentication that uses the public key encryption method, "sign" denotes performing processing using the secret key, and "verify" denotes confirming legality of the signature using a public key that corresponds to the secret key.

When transferring a digital work from a first device to a second device, the first device authenticates the second device (alternatively, the first and second devices perform mutual authentication) before transferring the digital work, in order to prevent illegal acts such as an illegal third party obtaining digital data over the communication path.

One example of opposite party authentication processing using a public key encryption technique is as follows. The first device transmits random number data to the second device, and the second device then applies a signature to the received random number data using its (the second device's) own secret key, to generate a signature text, and transmits the signature text back to the first device. Finally, the first device verifies the received signature data using the second device's public key.

However, it is a prerequisite in authentication that uses this kind of public key encryption technique that the public key is valid.

For this reason, usually a "public key certificate" that is "approval" to have a public key and that shows that the public key is a legal public key corresponding to the device is issued by an organization or a company called a certificate authority (hereinafter referred to as a "CA"). Furthermore, a certificate revocation list (hereinafter referred to as a "CRL") is issued. The CRL shows a list of information that specifies one or more revoked public key certificates, and has a purpose of notifying devices of public key certificates of devices that have been used illegally or whose secret key has been stolen, in order to revoked such public key certificates.

Consequently, a valuable digital work can be prevented from being given to an illegal communication party by, when authenticating an opposite party using the opposite party's public key, obtaining the public key certificate from the communication party and confirming that the obtained public key certificate is not registered in the CRL (is not revoked), before performing the above-described processing.

Note that public key certificates are described in detail in Document 2.

Document 2 discloses the following technique.

A method for protecting digital content from copying and/or other misuse as it is transferred between devices over insecure links, includes authenticating that both a content source and a content sink are compliant devices, establishing a secure control channel between the content source and the content sink, establishing a secure content channel, providing content keys, and transferring content. In a further aspect of the present invention, at least one certificate revocation list version identifier is exchanged between the content source and the content sink, and if the received certificate revocation list version identifier is more recent than the certificate revocation list version identifier stored in the receiving device, then the certificate revocation list of the receiving device is updated.

<Document 1>
W. Ford and M. Baum, *Digitaru Shomei to Ango Gijutsu (Digital Signatures and Encryption Techniques)*, trans. S. Yamada, Pearson Education Japan, 2000.
<Document 2>
U.S. Pat. No. 5,949,877 (Sep. 7, 1999), Content protection for transmission systems.

However, when the number of revoked users or devices increases, the size of the data of the CRL also increases. A problem arises that although devices that treat digital content have to store the CRL, such devices have limited area for storing data.

Furthermore, when digital content such as a movie is distributed recorded on a recording medium such as a DVD (digital versatile disk), a device such as a DVD driver obtains a legal CRL by reading a CRL stored on the DVD and uses the obtained CRL to authenticate the opposite device (computers and the like that work according to playback software for playback circuits in the device). However, this gives rise to a problem that the CRL stored on the DVD is not necessarily the newest CRL, and therefore the device may mistakenly authenticate a revoked opposite device as being a valid device.

SUMMARY OF THE INVENTION

In order to solve the stated problem, the object of the present invention is to provide an authentication communication system, an authentication apparatus, an authentication method, an authentication program, a recording medium, and a digital work protection system by which an area for storing information relating to revoked devices is smaller than is conventionally required, and a revoked device that is not listed in an old CRL is able to be recognized correctly.

In order to achieve the stated object, the authentication communication apparatus of the present invention is an authentication communication apparatus that authenticates an opposite party in communication, using a public encryption key, and communicates with the opposite party. The authentication communication apparatus is composed of a communication unit that communicates with one or more external device including at least the opposite party; a public key certificate confirmation unit that confirms a first public key certificate that is sent from the opposite party, the first public key certificate certifying that the public key of the opposite party is the public key of the opposite party; a public key revocation list check unit that judges validity of the public key certificate of the opposite party according to a public key certificate revoked device list showing one or more revoked public key certificates; a revoked device identifier storage unit that, when the public key revocation list check unit judges that the first public key certificate is revoked, stores the identifier of the opposite party included in the first public key certificate, as a revoked device identifier; and a verification processing unit that performs processing for verifying whether or not the opposite party is an opposite party listed in the first public key certificate. Here, in addition to judging the validity of the public key certificate of the opposite party during communication according to the public key certificate revocation device list, the public key revocation list check unit checks whether or not the identifier of the opposite party is the revoked device identifier stored in the revoked device identifier storage unit.

Take for example a system in which an authentication device starts communicating with an opposite party after mutual device authentication with the opposite party or after one of the devices authenticates the other device, and uses a public key certificate revoked device list CRL that is recorded on a recording medium or obtained directly from a certificate authority via, for instance, a communication unit over the Internet, when confirming the validity of a public key certificate sent from an opposite party authentication device. If for some reason the CRL cannot be obtained, the validity of the public key certificate of the opposite party authentication device can be confirmed based on the information stored in the revoked device identifier list storage unit. Here, the amount of data stored is less than if previously obtained CRL data is stored.

Furthermore, since a CRL is recorded on a recording medium may not necessarily be the newest CRL, validity can be confirmed with a greater degree of accuracy by using the CRL in conjunction with the information stored in revoked device identifier list storage unit.

Furthermore, since the revoked device identifier list storage unit stores one or more identifiers that are each of an opposite party authentication device that has performed authentication communication in the past with the authentication communication device and whose public key revocation certificate has been confirmed as being revoked, when a public key certificate of an opposite party authentication device has already been confirmed as being revoked, the opposite party authentication device can be confirmed both promptly and with certainty as being revoked when the opposite party authentication device attempts communication again.

Furthermore, by storing an identifier of each opposite party device that has not been confirmed as being revoked, and updating the validity thereof successively, the opposite party authentication device can be confirmed both with certainty and promptness as being revoked when the opposite party authentication device attempts communication again.

In this way, according to the present invention, when authentication devices mutually exchange public key certificates to perform authentication communication, each authentication device can check the validity of the public key certificate of the opposite party even if a public key certificate revocation list cannot be obtained, by storing an amount of data that requires less storage area than storing a CRL obtained in the past. This has an extremely high practical value in the present times in which distribution of digital works via transmission paths such as the Internet and recording media such as the DVD is thriving.

BRIEF DESCRIPTION OF THE DRAWINGS

These and other objects, advantages and features of the invention will become apparent from the following description thereof taken in conjunction with the accompanying drawings which illustrate a specific embodiment of the invention.

In the drawings:

FIG. 2 shows an example of the data structure of a public key certificate Cert-H 332;

FIG. 3 shows an example of the data structure of a public key certificate Cert-H 232;

FIG. 4 shows an example of the data structure of a driver revocation list CRL-D 401;

FIG. 18 shows an example of a data structure of an apparatus identifier list 231*b*; and FIG. 19 shows an example of the data structure of a driver identifier list 331*b*.

DESCRIPTION OF THE PREFERRED EMBODIMENTS

1. First Embodiment

The following describes a digital work protection system 1 as one embodiment of the present invention.

1.1 Structure of the Digital Work Protection System 1

Figure 1:
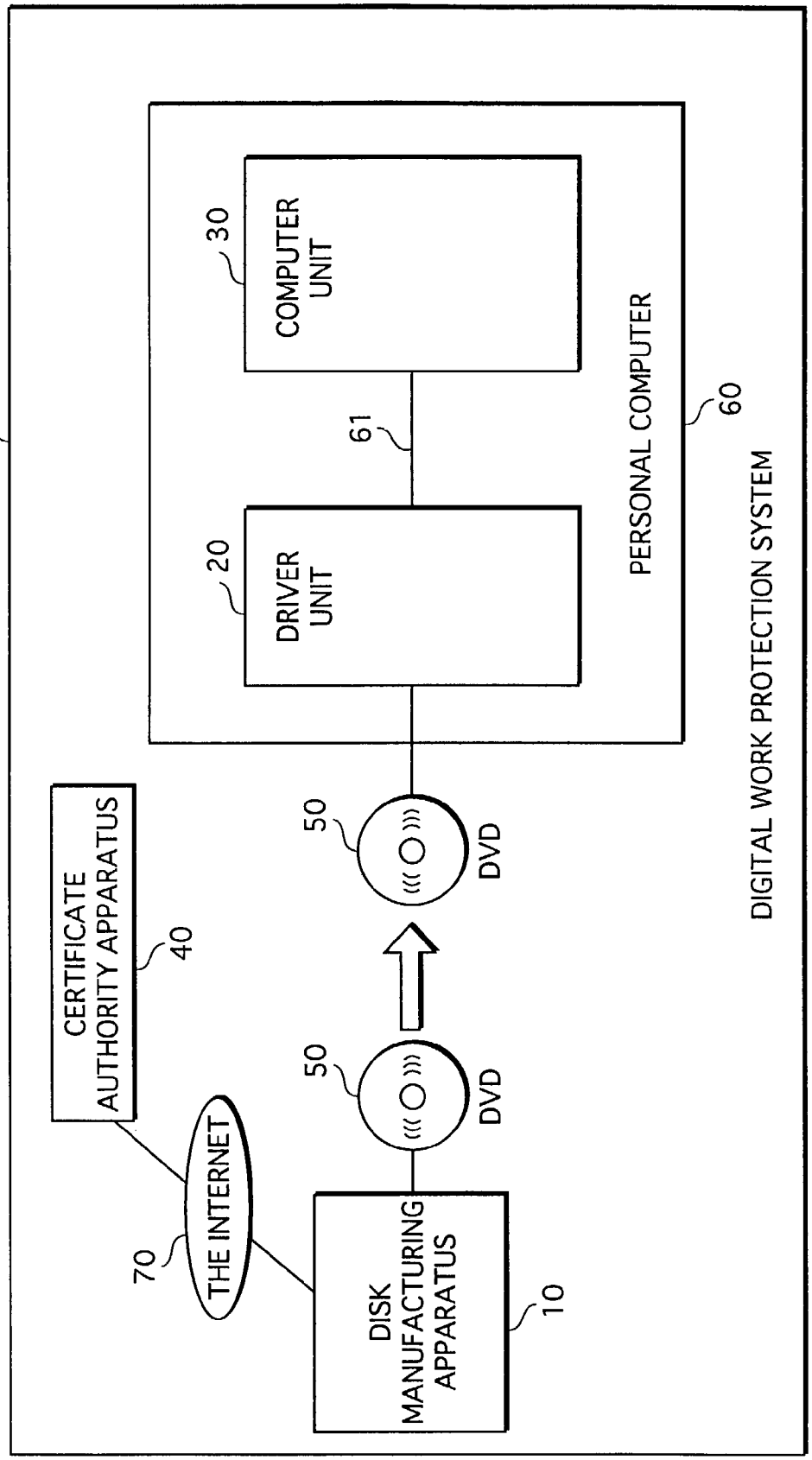
FIG. 1 is a function block drawing showing the overall structure of a digital work protection system 1.

As shown in FIG. 1, the digital work protection system 1 is composed of a certificate authority apparatus 40, a disk manufacturing apparatus 10, and a personal computer 60. The personal computer 60 is composed of a driver unit 20 and a computer unit 30 which are connected via a general-purpose communication path 61.

During the manufacturing process for the driver unit 20, the driver manufacturer generates a driver unit secret key and a driver unit public key for the driver unit 20, writes the generated driver unit secret key to a storage area that cannot be accessed from outside, and discloses the generated driver public key. Furthermore, the driver manufacturer makes a request to the certificate authority apparatus 40, which is held by a CA, to generate a public key certificate. The certificate authority apparatus 40 generates a public key certificate that corresponds to the driver unit public key, and the CA provides the generated public key certificate to the driver manufacturer. The driver manufacturer obtains the public key certificate, and writes the obtained public key certificate to the driver unit 20. Next, the driver manufacturer supplies the driver unit 20, to which the driver unit secret key and the public key certificate have been written, to a computer manufacturer.

In the manufacturing process for the computer unit 30, the computer manufacturer, who produces the personal computer 60, obtains the disclosed driver unit public key, and writes the obtained driver unit public key to the computer unit 30. In the same manner as the driver manufacturer, during the manufacturing process for the computer unit 30, the computer manufacturer generates a computer unit secret key and a computer unit public key for the computer unit 30, writes the generated computer unit secret key to a storage area in the computer unit 30 that cannot be accessed from outside, and discloses the generated computer public key. Furthermore, the computer manufacturer obtains a public key certificate that corresponds to the computer unit 30 from the CA, and writes the obtained public key certificate to the computer unit 30. Next, the computer manufacturer connects the supplied driver unit 20 to the computer unit 30 using the general-purpose communication path 61, thereby manufacturing the personal computer 60.

The manufactured personal computer 60 is put on sale via a seller, and a user consequently obtains the personal computer 60 by purchase.

A disk manufacturing apparatus 10 that is held by a content supplier stores content that is a digital work. The disk manufacturing apparatus 10 encrypts the content, and writes the encrypted content to the DVD 50, which is a recording medium. The DVD 50 to which the encrypted content has been written is put on sale.

The user purchases the DVD 50, and mounts the DVD 50 in the personal computer 60. On the DVD 50 being mounted in the personal computer 60 by the user, the computer unit 30 of the personal computer 60 reads the encrypted content from the DVD 50 via the driver unit 20, decrypts the read encrypted content to generate content, and plays back the generated content. In this way the user is able to enjoy the digital work.

Here, the following problems occur when protecting the digital work in the digital work protection system 1.

Firstly, when a computer unit connected to the driver unit 20 is not a legal device, it is possible that after decrypting the content the illegal computer unit may act in a manner not authorized by the copyright holder, for example, redistributing the content over the Internet or making unlimited copies of the content. Secondly, it is possible that the illegal computer unit may use an illegal means to record the content in a type of recording medium, such as a HDD (hard disk) that is not authorized by the copyright holder, and have the legal computer unit 30 play back the content, pretending that the content is recorded on a legal DVD.

The two following functions are realized in the digital work protection system 1 in order to solve these problems. Firstly, the driver unit 20 authenticates the main computer to confirm whether the main computer is legal. This is to prevent content recorded on the DVD 50, which is a legal recording medium, from being transferred to an illegal computer unit and distributed illegally. Secondly, the computer unit 30 authenticates the driver unit to confirm whether the driver unit is legal. This is to prevent an illegal driver unit pretending that content illegally recorded on a recording medium is legally recorded content, sending the content to the computer unit 30, having the content decrypted by the computer unit 30 and played back.

For this reason, necessary information for playback, such as encrypted content, is transferred from the driver unit 20 to the computer unit 30 via a Secure Authentication Channel (hereinafter called an "SAC") that is used for encryption communication in which the drive unit 20 and the computer unit 30 perform mutual authentication and share a common session key. Note that the process of the driver unit 20 and the computer unit 30 performing mutual authentication, and sharing the session key is called SAC setting processing.

In addition, when the public key certificate of a driver unit or a computer unit being authenticated is revoked, the certificate authority 40 generates a driver revocation list CRL-D and an apparatus revocation list CRL-H, and transmits the generated driver revocation list CRL-D and the generated apparatus revocation list CRL-H to the disk manufacturing apparatus 10 that is held by the content supplier, via the Internet 70. Here, the driver revocation list CRL-D shows that the public key certificate corresponding to the driver unit is revoked, and the apparatus revocation list CRL-H shows that the public key certificate corresponding to the computer unit is revoked. The manufacturing apparatus 10 writes the received CRL-D and CRL-H, in addition to the encrypted content, to the DVD 50, and the DVD 50 to which the encrypted content and the CRLs have been written is put on sale.

The driver unit 20 and the computer unit 30 each read the driver revocation list CRL-D and the apparatus revocation list CRL-H from the DVD 50, judge whether the public key certificate corresponding to the opposite apparatus is revoked or not, and when the public key certificate is revoked, stop usage of the opposite apparatus.

1.2 Structure of the Certificate Authority Apparatus 40

The certificate authority apparatus 40 is, specifically, a computer system (not illustrated) that is composed of a microprocessor, a ROM, a RAM, a hard disk unit, a LAN connection unit, a display unit, a keyboard, a mouse and so on. A computer program is stored in the RAM or the hard disk unit, and the certificate authority apparatus 40 achieves its functions by the microprocessor operating according to the computer program.

The CA receives requests to generate a public key certificate from the driver manufacturer and the computer manufacturer. When such a request is received, the CA receives the computer unit public key from the personal computer manufacturer and the driver unit public key from the driver manufacturer, and respective validity periods. On receiving the respective requests, the certificate authority apparatus 40 generates public key certificates for the respective public keys, based on the respective received validity periods.

One example of a public key certificate corresponding to a computer unit public key is shown in FIG. 2. A public key certificate Cert-H 332 shown in FIG. 2 includes a computer unit identifier ID-H, a computer unit public key PK-H, CA signature data for the public key PK-H, and a validity period. Here, the identifier ID-H is identification information that identifies the computer unit. The public key PK-H is a public key generated to correspond to the computer unit. The signature data is generated by the CA by applying a digital signature to the public key PK-H. The validity period is a period for which the public key certificate is valid, and is composed of a starting year, month and day and an ending year, month and day.

A detailed description of public key certificates is given in W. Ford and M. Baum, *Digitaru Shomei to Ango Gijutsu (Digital Signatures and Encryption Techniques)*, trans. S. Yamada, Pearson Education Japan, 2000, and is therefore omitted here.

One example of a public key certificate corresponding to a driver unit public key is shown in FIG. 3. A public key certificate Cert-D 232 shown in FIG. 3 includes a driver unit identifier ID-D, a computer unit public key PK-D, CA signature data for the public key PK-D, and a validity period. Here, the identifier ID-D is identification information that identifies the driver unit. The public key PK-D is a public key generated to correspond to the driver unit. The signature data is generated by the CA by applying a digital signature to the public key PK-D. The validity period is a period for which the public key certificate is valid, and is composed of a starting year, month and day and an ending year, month and day of the validity period.

A public key certificate generated in this way by the certificate authority apparatus 40 is supplied to the driver manufacturer or the computer manufacturer by the CA.

Furthermore, when the CA discovers that the public key certificate of the driver unit or the computer unit is to be revoked, the certificate apparatus 40 generates a driver revocation list CRL-D showing that the public key certificate of the driver unit is revoked, and an apparatus revocation list CRL-H showing that the public key certificate of the computer unit is revoked.

Here, an example of the driver revocation list CRL-D is shown in FIG. 4. A driver revocation list CRL-D 401 shown in FIG. 4 is composed of a file header, a general section, and a revocation list section.

The file header is composed of a file name, a size, a type and an update date ("this update"). The file name is a name that identifies the drive revocation list CRL-D 401, which is one file. The size shows the length of the data of the driver revocation list CRL-D 401. The type shows the type of data included in the driver revocation list CRL-D 401. Here, as one example, the type is "certificate revocation list", which shows that CRL-D 401 is a public key certificate revocation list. "This update" shows a date and time that the information shown in the driver revocation list CRL-D 401 was last updated.

The general section includes a version, an issuer, a validity start date, a next scheduled update date ("next update"), and a signature algorithm. The version shows the number of the update of the driver revocation list CRL-D 401. The issuer shows the name of the party that generated and issued the driver revocation list CRL-D 401. The validity start date shows the first date when usage of the driver revocation list CRL-D 401 is valid, and is composed of a year, month and day. "Next update" shows a date when the driver revocation list CRL-D 401 is scheduled to be next updated. The signature algorithm shows the digital signature algorithm used when generating the signature data included in the public key certificate.

The revocation list section includes a plurality of pieces of revocation information, each of which is composed of a serial number and a revocation date, and corresponds to a revoked public key certificate. The serial number included in each piece of revocation information is identifying information that identifies the corresponding revoked public key certificate. The revocation date included in each piece of revocation information shows the date that the corresponding public key certificate was revoked, and is composed of a year, month and day.

As time passes and the number of revoked certificates increases, the number of entries (the number of drivers registered in the list) of revoked certificate serial numbers included in the driver revocation list CRL-D 401 increases, and the file size of the CRL-D increases.

The apparatus revocation list CRL-H has an identical data structure to the driver revocation list CRL-D 401, and therefore a description is omitted here.

When the CA discovers that a public key certificate of a different driver unit and a different computer unit are to be revoked, the certificate authority apparatus 40 newly generates a driver revocation list CRL-D showing that the public key certificate of that driver unit is revoked, and an apparatus revocation list CRL-H showing that that the public key certificate of that computer unit is revoked. In this way, the driver revocation list CRL-D and the apparatus revocation list CRL-H are continually updated to the newest state.

The certificate authority apparatus 40 transmits the apparatus revocation list CRL-H and the driver revocation list CRL-D to the disk manufacturing apparatus 10 via the Internet 70 as required.

1.3 Structure of the Disk Manufacturing Apparatus 10

Figure 5:
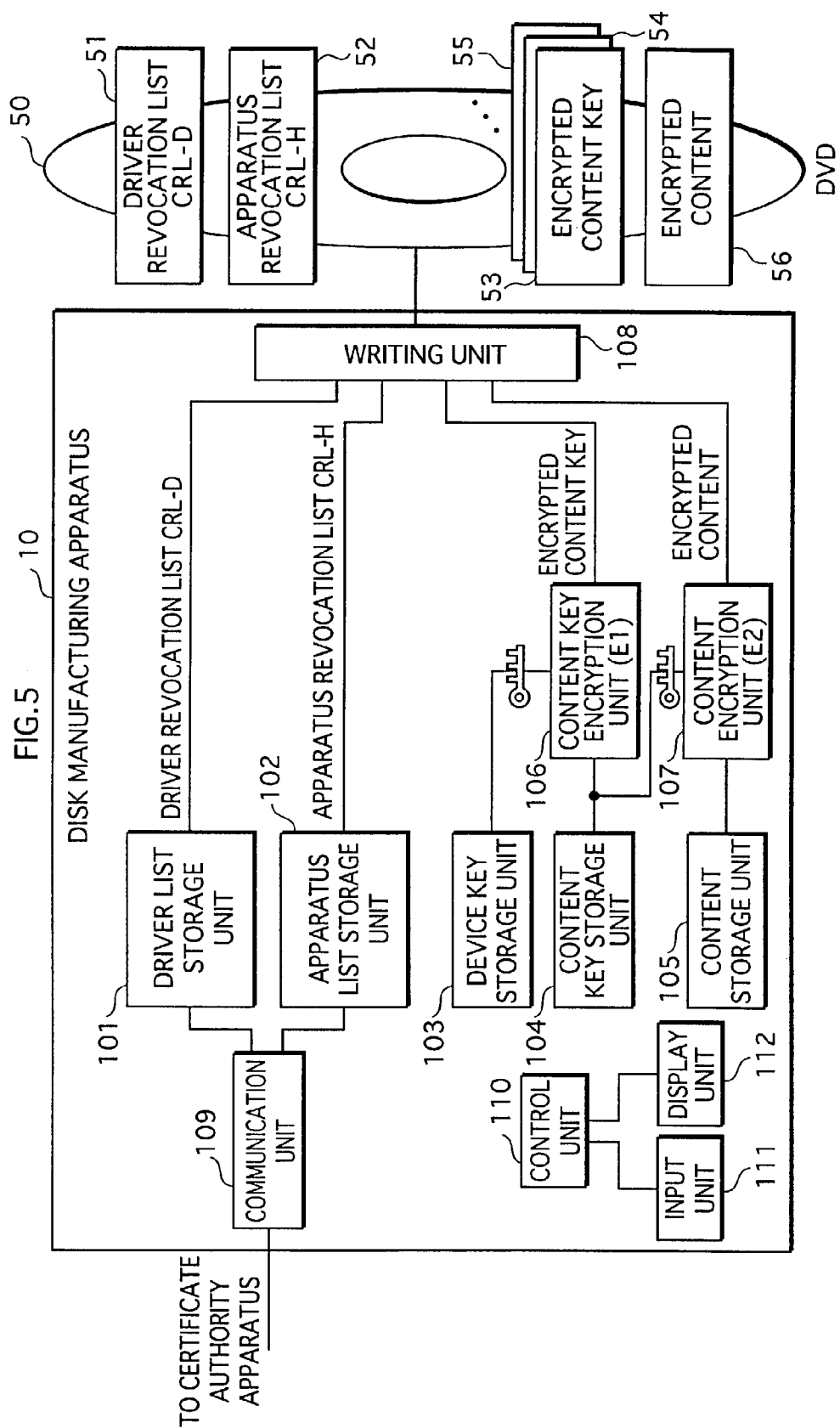
FIG. 5 is a block diagram showing the structure of a disk manufacturing apparatus 10.

As shown in FIG. 5, the disk manufacturing apparatus 10 is composed of a driver list storage unit 101, an apparatus list storage unit 102, a device key storage unit 103, a content key storage unit 104, a content storage unit 105, a content key encryption unit 106, a content encryption unit 107, a writing unit 108, a communication unit 109, a control unit 110, an input unit 111, and a display unit 112. The disk manufacturing apparatus 10 is, specifically, a computer system like the certificate authority apparatus 40, and is composed of a microprocessor, a ROM, a RAM and so on. The disk manufacturing apparatus 10 achieves its functions by the microprocessor operating according to a computer program.

According to operations by a content creator, or a content manufacturer who has received a request from a content creator, the disk manufacturing apparatus 10 encrypts a content key that is for decrypting content, thereby generating a plurality of encrypted content keys, encrypts the content using the content key to generate encrypted content, and, in order to improve copyright protection of the content in the personal computer 60, records the drive revocation list CRL-D, the apparatus revocation list CRL-H, the plurality of encrypted content keys, and the encrypted content on the DVD 50.

(1) Driver List Storage Unit 101 and Apparatus List Storage Unit 102

The driver list storage unit 101 includes an area for storing the driver revocation list CRL-D.

The apparatus list storage unit 102 includes an area for storing the apparatus revocation list CRL-H.

Note that the driver revocation list CRL-D and the apparatus revocation list CRL-H are as described above, and are therefore not described here.

(2) Communication Unit 109

The communication unit 109 is connected to the certificate authority apparatus 40 via the Internet 70.

The communication unit 109 accesses the authentication apparatus 40 via the Internet 70 at regular intervals, obtains the driver revocation list CRL-D and the apparatus revocation list CRL-H from the certificate authority 40, and writes the obtained driver revocation list CRL-D and apparatus revocation list CRL-H respectively to the driver list storage unit 101 and the apparatus list storage unit 102.

(3) Device Key Storage unit 103

The device key storage unit 103 stores a plurality of device keys $KD-H_1$, $KD-H_2$, $KD-H_3$, through to $KD-H_n$ (collectively referred to as a "device key bundle") in advance. Each of the plurality of device keys is a unique key of a computer unit in one of a plurality of personal computers. Each device key is, for example, 128 bits in length.

The device key bundle is supplied, for example, from a copyright protection licensor, which is not shown in the structural diagram of the copyright protection system 1. Note that the device key storage unit 103 has a structure that enables the stored device key bundle to be accessed only by authorized parties.

(4) Content Key Storage Unit 104

The content key storage unit 104 stores in advance a content key Kc that is for encrypting content. The content key Kc is 128 bits in length.

Note that the content key storage unit 104 has a structure that enables the stored content key to be accessed only by authorized parties.

(5) Content Storage Unit 105

The content storage unit 105 stores in advance content that is a digital work such as a movie or music.

(6) Content Key Encryption Unit 106

The content key encryption unit 106 has an encryption algorithm E1. Here, the encryption algorithm E1 complies, for example, with the key length 128-bit AES method. Note that the AES method is described in detail in National Institute of Standards and Technology, "Report on the Development of the Advanced Encryption Standard (AES)", Oct. 2, 2000.

The content key encryption unit 106 reads the plurality of device keys $KD-H_1$ to $KD-H_n$ from the device key storage unit 103, reads the content key Kc from the content key storage unit 104, and applies the encryption algorithm E1 to the read content key Kc, using the read plurality of device keys $KD-H_1$ to $KD-H_n$ respectively, to generate a plurality of encrypted content keys $EKc_1$, $Ekc_2$, $Ekc_3$, through to $Ekc_n$, that are equal in number to the device keys. The content key encryption unit 106 then outputs the generated encrypted content keys $EKc_1$, $Ekc_2$, $Ekc_3$, through to $Ekc_n$ to the writing unit 108.

Here, the encrypted content keys $EKc_1$, $Ekc_2$, $Ekc_3$, through to $Ekc_n$ are collectively referred to as an encrypted content key bundle.

(7) Content Key Encryption Unit 107

The content key encryption unit 107 has an encryption algorithm E2. Here, the encryption algorithm E2 complies, for example, with the key length 128-bit AES method.

The content encryption unit 107 reads the content from the content storage unit 105, reads the content key Kc from the content key storage unit 104, applies the encryption algorithm E2 to the read content using the read content key Kc, to generate encrypted content, and outputs the generated encrypted content to the writing unit 108.

(8) Writing Unit 108

The writing unit 108 reads the driver revocation list CRL-D and the apparatus revocation list CRL-H from the driver list storage unit 101 and the apparatus list storage unit 102, respectively, receives the encrypted content key bundle from the content key encryption unit 106, and receives the encrypted content from the content encryption unit 107. The writing unit 108 then writes the read driver revocation list CRL-D and apparatus revocation list CRL-H, the received encrypted content key bundle, and the received encrypted content to the DVD 50.

(9) Control Unit 110, Input Unit 111 and Display Unit 112

The control unit controls the various compositional elements of the disk manufacturing apparatus 10.

The input unit 111 receives input from the operator.

The display unit 112 displays various information, under the control of the control unit 110.

1.4 Structure of the Computer Unit 30

Figure 6:
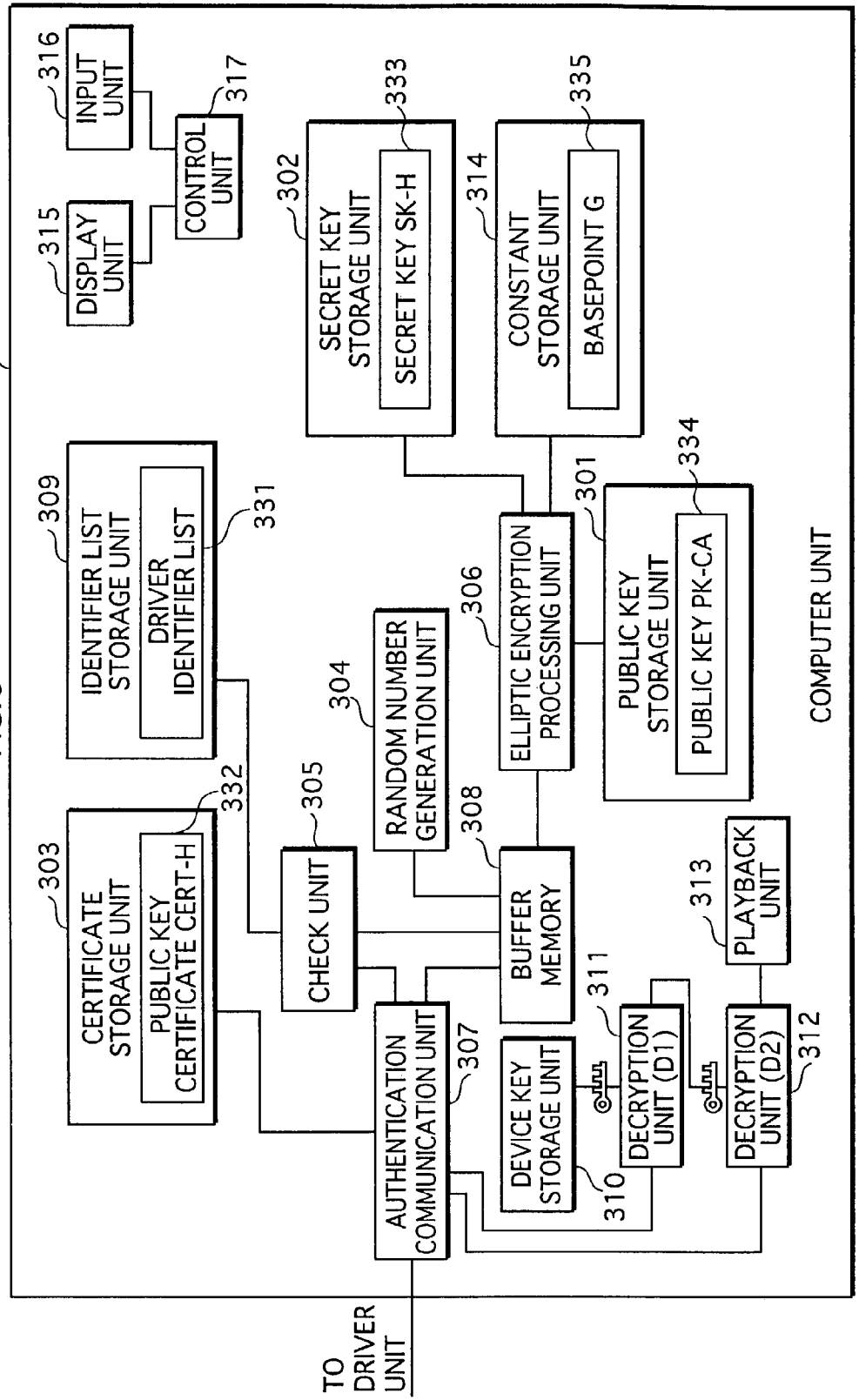
FIG. 6 is a block diagram showing the structure of a computer unit 30.

As shown in FIG. 6, the computer unit 30 is composed of a public key storage unit 301, a secret key storage unit 302, a certificate storage unit 303, a random number generation unit 304, a check unit 305, an elliptic encryption processing unit 306, an authentication communication unit 307, a buffer memory 308, an identifier list storage unit 309, a device key storage unit 310, a decryption unit 311, a decryption unit 312, a playback unit 313, a constant storage unit 314, a display unit 315, an input unit 316, and a control unit 317.

The computer unit 30 is, specifically, a computer system composed of a microprocessor, a ROM, a RAM, a hard disk unit, a LAN connection unit, a display unit, a keyboard, a mouse and so on. A computer program is stored in the RAM or the hard disk unit, and the computer unit 30 achieves its functions by the microprocessor operating according to the computer program.

(1) Public Key Storage Unit 301 and Secret Key Storage Unit 302

The public key storage unit 301 stores in advance a CA public key PK-CA that is used when verifying a CA signature.

The secret key storage unit 302 stores in advance a secret key SK-H that is unique to the computer unit 30 and that is used when the computer unit 30 signs its own signature. Note that the secret key storage unit 302 has a structure that enables the stored computer unit secret key to be accessed only by authorized parties.

(2) Certificate Storage Unit 303

The certificate storage unit 303 stores the public key certificate Cert-H. The public key certificate Cert-H is as described earlier, and is a document for certifying that the public key PK-H belongs to the computer unit 30.

(3) Identifier List Storage Unit 309

Figure 7:
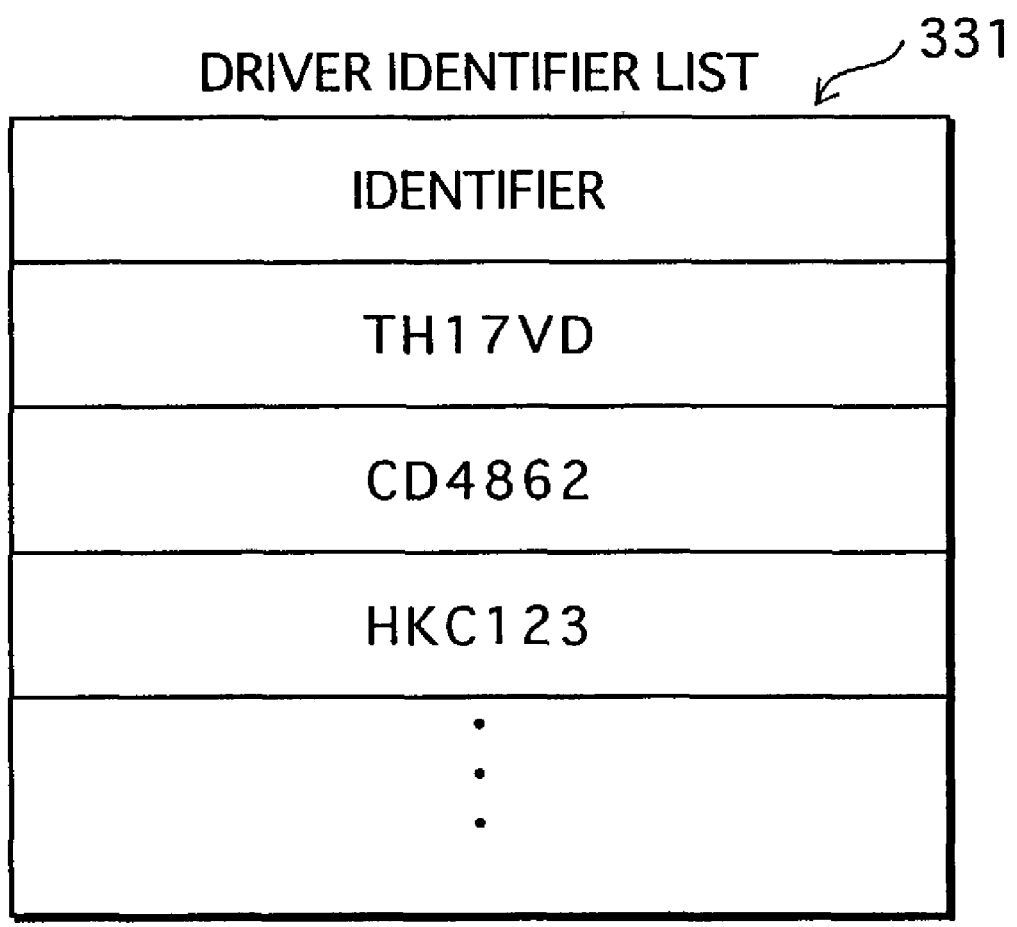
FIG. 7 shows an example of the data structure of a driver identifier list 331.

As shown as one example in FIG. 7, the identifier list storage unit 309 has a driver identifier list 331 that includes identifiers that identify revoked drive units. The identifiers in the driver identifier list 331 are information that identifies revoked driver units that the computer unit 30 has known up to the present.

The identifier list storage unit 309 has a structure that enables the stored identifiers of the revoked driver units to be accessed only by authorized parties.

(4) Device Key Storage Unit 310

The device key storage unit 310 stores in advance a device key KD-H that is unique to the computer unit 30. The device key KD-H is a secret key and is 128 bits in length.

Note that the device key storage unit 310 has a structure that enables the stored device key KD-H to accessed only by authorized parties.

(5) Random Number Generation Unit 304

The random number generation unit 304 generates 160-bit random numbers y and y' as time-variable values, and writes the generated random numbers y and y' to the buffer memory 308.

(6) Check Unit 305

The check unit 305 reads the public key certificate Cert-D from the buffer memory 308, extracts the driver unit identifier ID-D from the read public key certificate Cert-D, and judges whether the extracted identifier ID-D is included in the driver identifier list 331 stored in the identifier list storage unit 309. When the extracted identifier ID-D is included in the driver identifier list 331, the check unit 305 controls so that the authentication communication unit 307 stops communicating with the driver unit 20, thereby stopping communicating between the driver unit 20 and the computer unit 30. When the extracted identifier ID-D is not included in the driver identifier list 331, the check unit 305 further judges whether the identifier ID-D is included in the driver revocation list CRL-D stored in the buffer memory 308. When the identifier ID-D is included in the driver revocation list CRL-D, the check unit 305 writes the identifier ID-D to the driver identifier list 331 stored in the identifier list storage unit 309, and controls so that the authentication communication unit 307 stops communicating with the driver unit 20, thereby stopping communication between the driver unit 20 and the computer unit 30. When the identifier ID-D is not included in the driver revocation list CRL-D, the processing continues.

Furthermore, the check unit 305 receives verification failure information showing that verification has failed, from the elliptic encryption processing unit 306. On receiving the verification failure information, the check unit 305 adds the identifier ID-D to the driver identifier list 331 stored in the identifier list storage unit 309, and controls so that the authentication communication unit 307 stops communication with the driver unit 20, thereby stopping communication between the driver unit 20 and the computer unit 30.

(7) Constant Storage Unit 314

The constant storage unit 314 stores in advance a basepoint G on an elliptic curve.

(8) Elliptic Encryption Processing Unit 306

The elliptic encryption processing unit 306 executes signature generation processing and key sharing processing according to elliptic curve encryption during authentication and the like in SAC setting processing, in the following way.

The elliptic encryption processing unit 306 reads the public key PK-CA from the public key storage unit 301, reads the public key certificate Cert-D from the buffer memory 308, and performs digital signature verification of the read public key certificate Cert-D.

Here, the digital signature verification complies with the elliptic curve DSA signature method in which security is based on a discrete logarithm problem on the elliptic curve. The elliptic curve DSA signature method is described in detail in "ANSI X9.62-1998, Public-key Cryptosystem for the Financial Services Industry: Elliptic Curve Digital Signature Algorithm (ECDSA), and therefore is not described here.

When the digital signature verification fails, the elliptic encryption processing unit 306 outputs verification failure information showing that verification has failed, to the check unit 305. When verification is successful, the processing continues.

The elliptic encryption processing unit 306 reads a basepoint G 335 from the constant storage unit 314, reads a the random number y' from the buffer memory 308, performs multiplication y'*G on an elliptic curve, using the read basepoint G and the read random number y', and then writes an operation result y'*G to the buffer memory 308.

Here, "*" is an operator showing multiplication on an elliptic curve. For example, "x*G" represent an operation to add a point G on the elliptic curve to itself x times.

Next, the elliptic encryption processing unit 306 reads the secret key SK-H from the secret key storage unit 302, reads the random number x from the buffer memory 308, applies a digital signature Sig using the read secret key SK-H, the operation result y'*G and the read random number x, to generate signature data S1, and writes the generated signature data S1 to the buffer memory 308.

$$S1 = Sig(SK\text{-}H, (y'*G) \| x)$$

Here, the digital signature Sig complies with the elliptic curve DSA signature method.

Furthermore, "||" expresses bit concatenation, and shows that y'*G and the random number x are concatenated in a digit direction. Specifically, (y'*G)||x is a 480-bit bit string generated by concatenating the x coordinate of y'*G (160 bits), the y coordinate of y'*G (160 bits), and the random number x (160 bits) in the stated order.

In addition, the elliptic encryption processing unit 306 reads the operation result x'*G and signature data S0 from the buffer memory 308, reads the public key certificate Cert-D from the buffer memory 308, and extracts the public key PK-D from the read public key certificate Cert-D. The elliptic encryption processing unit 306 then applies a digital signature verification VER to the read operation result x'*G and signature data S0, and when the verification result is failure, outputs verification failure information showing that verification failed to the check unit 305. In this case, communication between the driver unit 20 and the computer unit 30 is stopped. When the verification result is success, the processing continues.

Here, the digital signature verification VER complies with the elliptic curve DSA signature method.

Furthermore, the elliptic encryption processing unit 306 reads the random number y' and the operation result x'*G from the buffer memory 308, generates a session key K' in the following manner, and writes the generated session key K' to the buffer memory 308.

$$K' = y'(x'*G)$$

The session key K' generated in this way has the same value as a session key K (described later) generated by an elliptic encryption processing unit 207.

(9) Authentication Communication Unit 307

As described below, the authentication communication unit 307 controls authentication processing and the like when SAC setting processing is performed with the driver unit 20, while also being a communication interface unit for performing the necessary encryption processing in encryption communication after SAC setting processing.

The authentication communication unit 307 receives a playback instruction to playback encrypted content, from the input unit 316 via the control unit 317. On receiving the playback instruction, the authentication communication unit 307 generates a read instruction showing reading of the drive revocation list CRL-D, and outputs the generated read instruction to the drive unit 20 via the general-purpose communication path 61. Next, the authentication communication unit 307 receives the drive revocation list CRL-D from the authentication communication unit 208 via the general-purpose communication path 61, and writes the received drive revocation list CRL-D to the buffer memory 308.

The authentication communication unit 307 reads the public key certificate Cert-H from the certificate storage unit 303, reads the random number y from the buffer memory 308, and outputs the read public key certificate Cert-H and random number y to the driver unit 20 via the general-purpose communication path 61.

The authentication communication unit 307 receives the public key certificate Cert-D and the random number x from the authentication communication unit 208 via the general-purpose communication path 61, and writes the received public key certificate Cert-D and random number x to the buffer memory 308.

The authentication communication unit 307 reads the operation result y'*G and the signature data S1 from the buffer memory 308, and outputs the read operation result y'*G and signature data S1 to the driver unit 20.

The authentication communication unit 307 receives the operation result x'*G and the signature data S0 from the authentication communication unit 208 via general-purpose communication path 61, and writes the received operation result x'*G and signature data S0 to the buffer memory 308.

The authentication communication unit 307 receives a plurality of double-encrypted content keys and double-encrypted content from the authentication communication unit 208 via the general-purpose communication path 61, and reads the session key K' from the buffer memory 308. The authentication communication unit 307 then applies a decryption algorithm D3 to the plurality of double-encrypted content keys and the double-encrypted content, to generate a plurality of encrypted content keys and encrypted content, outputs the generated plurality of encrypted content keys to the decryption unit 311, and outputs the generated encrypted content to the decryption unit 312.

Here, the decryption algorithm D3 corresponds to an encryption algorithm E3 that is described later.

(10) Buffer Memory 308

The buffer memory 308 includes an area for temporarily holding data such as a random number generated by the random number generation unit 304 and data generated by the elliptic encryption processing unit 306.

(11) Decryption Unit 311 and Decryption Unit 312

The decryption unit 311 receives the plurality of encrypted content keys from the authentication communication unit 307, and specifies its own encryption content key from among the received plurality of encrypted content keys. Here, it is supposed that the specified encryption key is predetermined as a particular number key among the plurality of encrypted content keys.

The decryption unit 311 reads the device key KD-H from the device key storage unit 310, applies a decryption algorithm D1 to the specified encrypted content key using the read device key KD-H, to generate a content key Kc, and outputs the generated content key Kc to the decryption unit 312.

Here, the decryption algorithm D1 corresponds to the encryption algorithm E1, and is a key length 128-bit AES method.

The decryption unit 312 receives encrypted content from the authentication communication unit 307, receives the content key Kc from the decryption unit 311, applies a decryption algorithm D2 to the received encryption content using the received content key Kc, to generate content, and outputs the generated content to the playback unit 313.

Here, the decryption algorithm D2 corresponds to the encryption algorithm E2, and is a key length 128-bit AES method.

(12) Playback Unit 313

The playback unit 313 receives content from the decryption unit 312, plays back the received content, and outputs the played back content.

(13) Display Unit 315, Input Unit 316, and Control Unit 317

The input unit 316 receives a playback instruction to play back encrypted content recorded on the DVD 50 from the user, and outputs the received playback instruction to the authentication communication unit 307 via the control unit 317.

The control unit 317 controls the various compositional elements of the computer unit 30.

The display unit 315 displays various information, under the control of the control unit 317.

1.5 Structure of the Driver Unit 20

Figure 8:
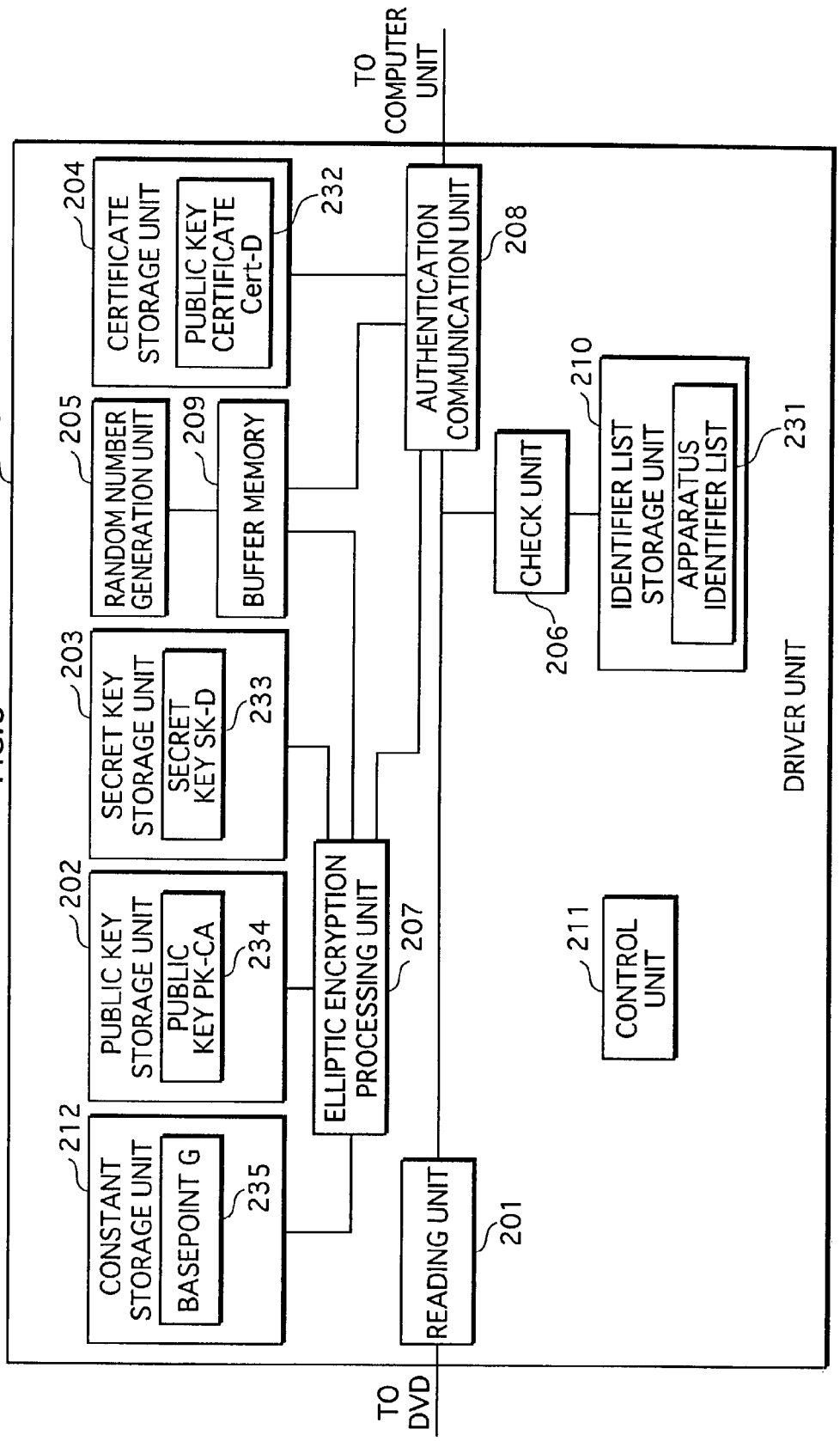
FIG. 8 is a block diagram showing the structure of a driver unit 20.

As shown in FIG. 8, the driver unit 20 is composed of a reading unit 201, a public key storage unit 202, a secret key storage unit 203, a certificate storage unit 204, a random number generation unit 205, a check unit 206, the elliptic encryption processing unit 207, an authentication communication unit 208, a buffer memory 209, an identifier list storage unit 210, and a constant storage unit 212.

(1) Public Key Storage Unit 202 and Secret Key Storage Unit 203

The public key storage unit 202 stores in advance the CA public key PK-CA used for verifying the CA signature.

The secret key storage unit 203 stores in advance a driver unique secret key SK-D that the driver unit 20 uses in its own signature. Note that the secret key storage unit 203 has a structure that enables the driver secret key to be accessed only by authorized parties.

(2) Certificate Storage Unit 204

The certificate storage unit 204 stores in advance the public key certificate Cert-D that is a document for certifying that the public key PK-D belongs to the driver unit 20. The public key certificate Cert-D is as described earlier, and is therefore not described here.

(3) Identifier List Storage Unit 210

Figure 9:
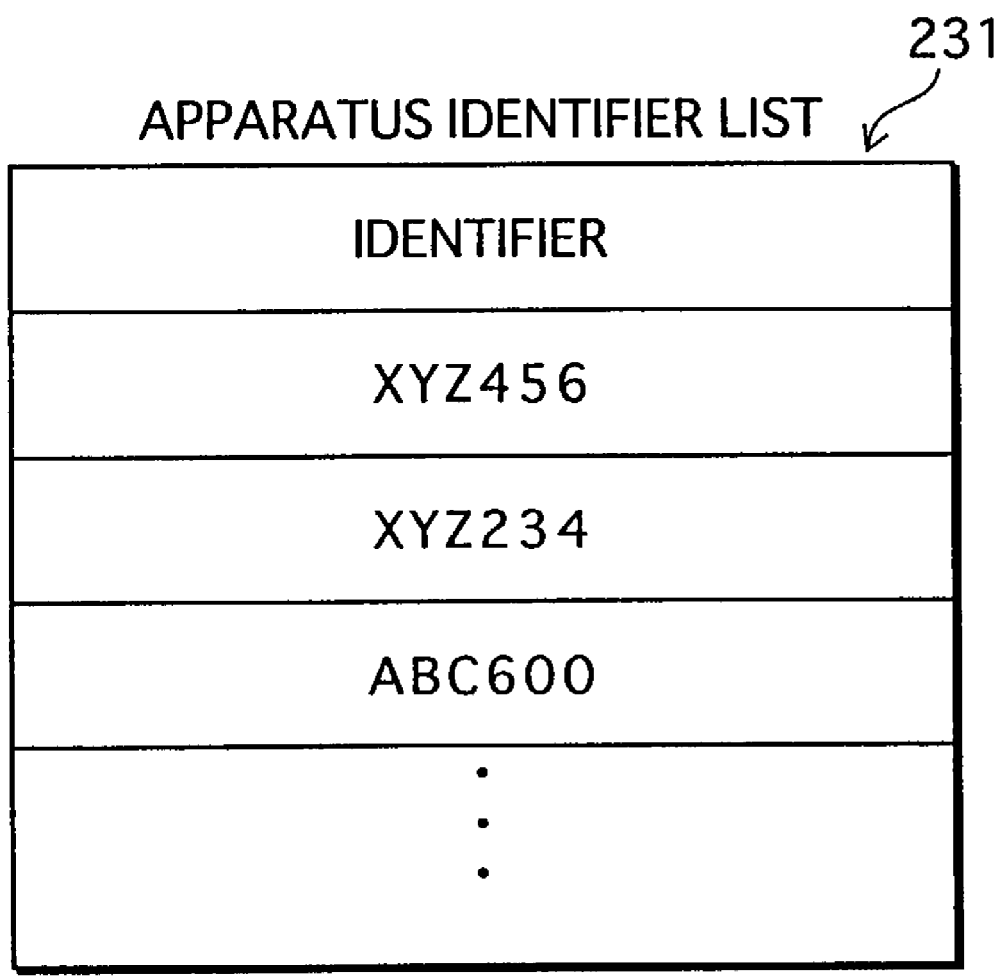
FIG. 9 shows an example of the data structure of an apparatus identifier list 231.
Figure 10:
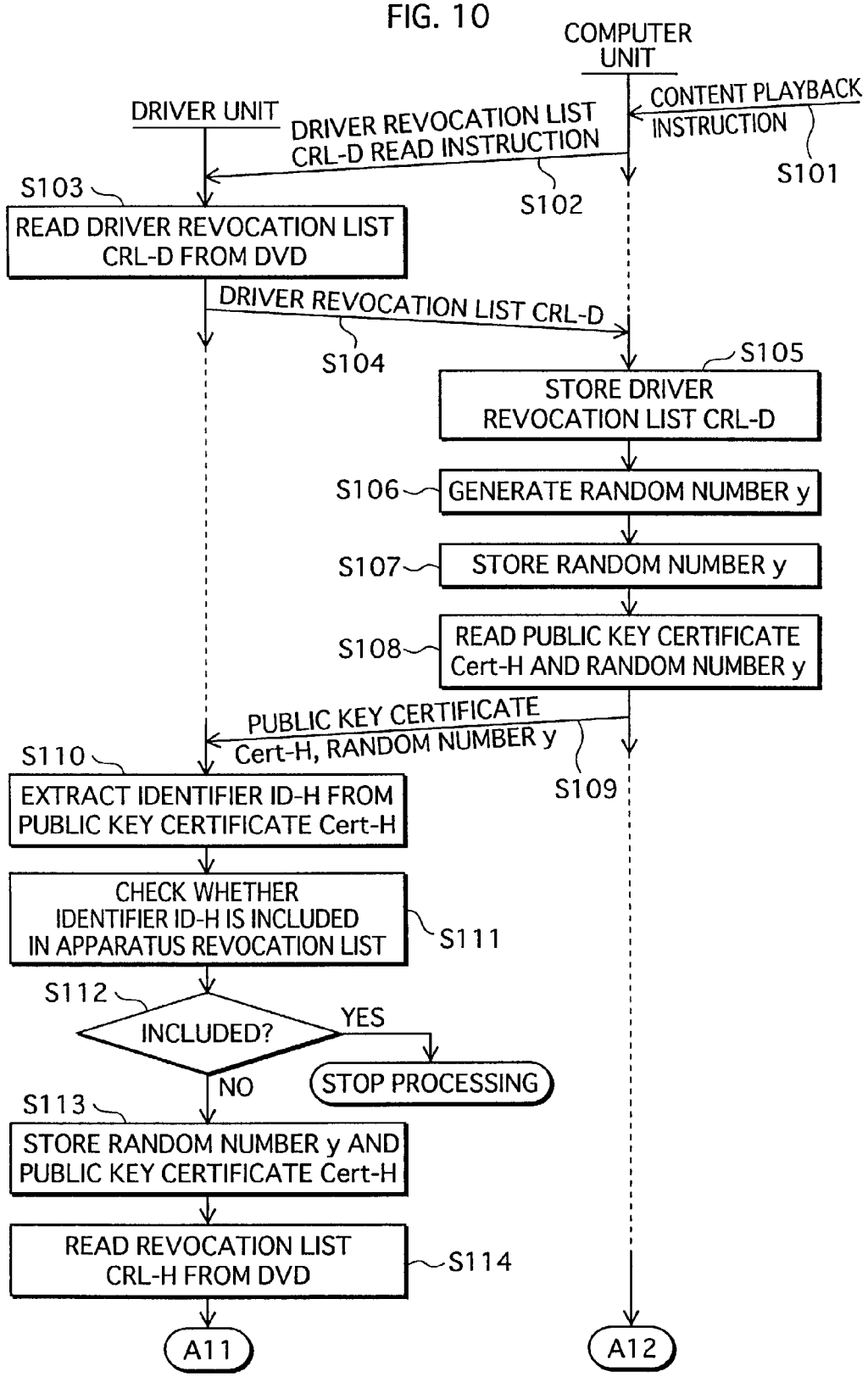
FIG. 10 is a flowchart showing operations between the driver unit 20 and the computer unit 30 in SAC setting processing, and in decrypting encrypted content that is recorded on a DVD 50, and continues in FIG. 11.
Figure 11:
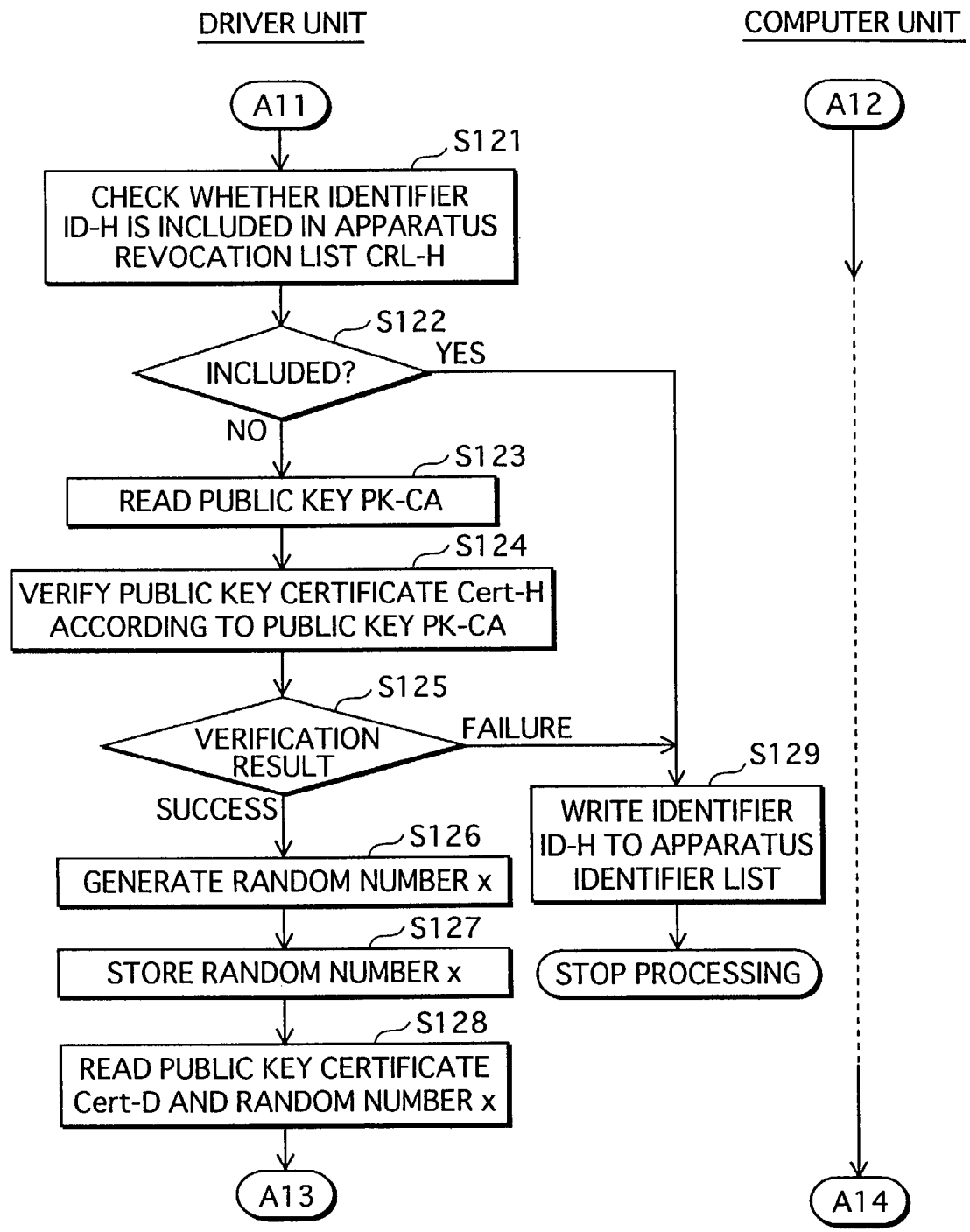
FIG. 11 is a flowchart showing operations between the driver unit 20 and the computer unit 30 in SAC setting processing, and in decrypting encrypted content that is recorded on a DVD 50, and continues in FIG. 12.
Figure 12:
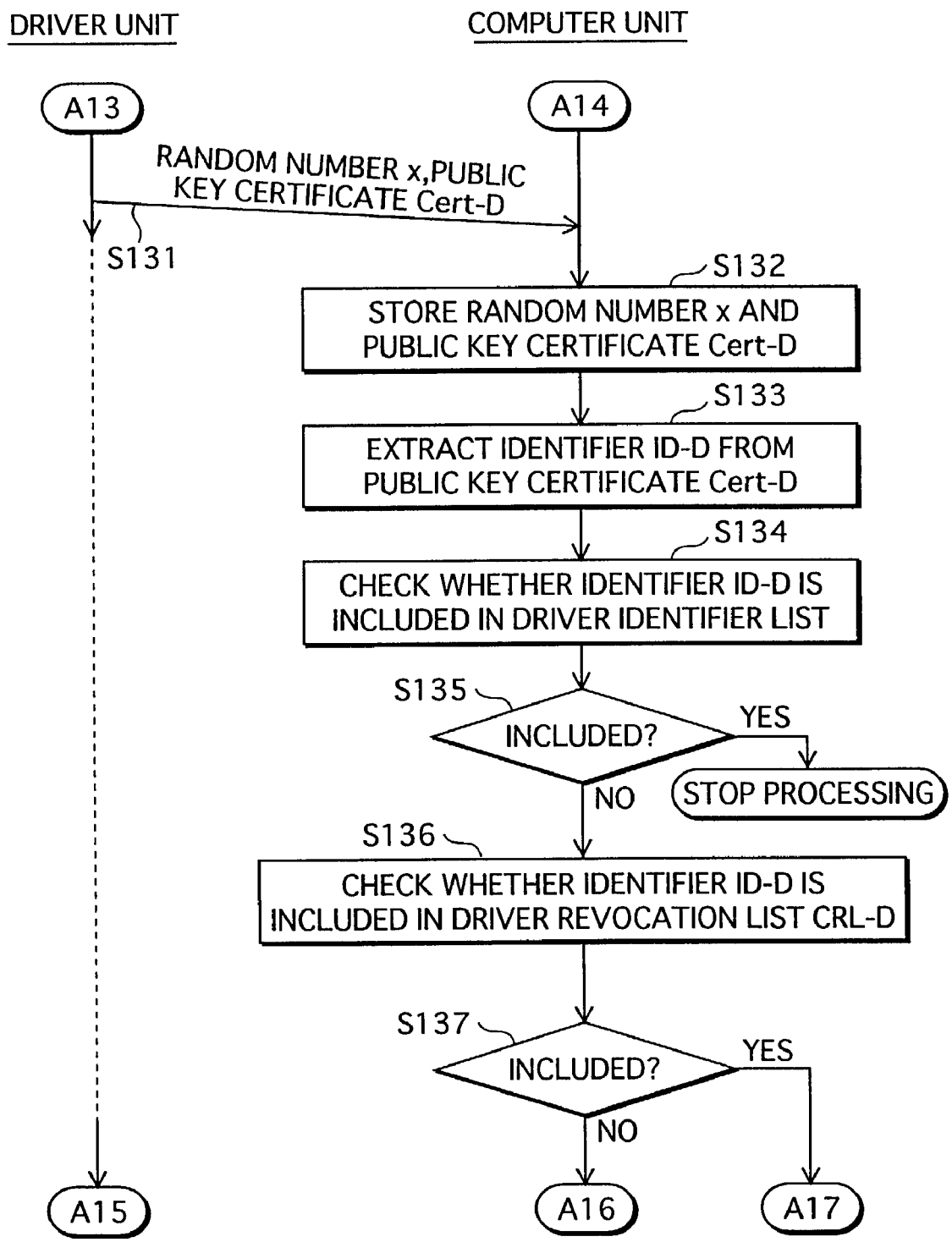
FIG. 12 is a flowchart showing operations between the driver unit 20 and the computer unit 30 in SAC setting processing, and in decrypting encrypted content that is recorded on a DVD 50, and continues in FIG. 13.
Figure 13:
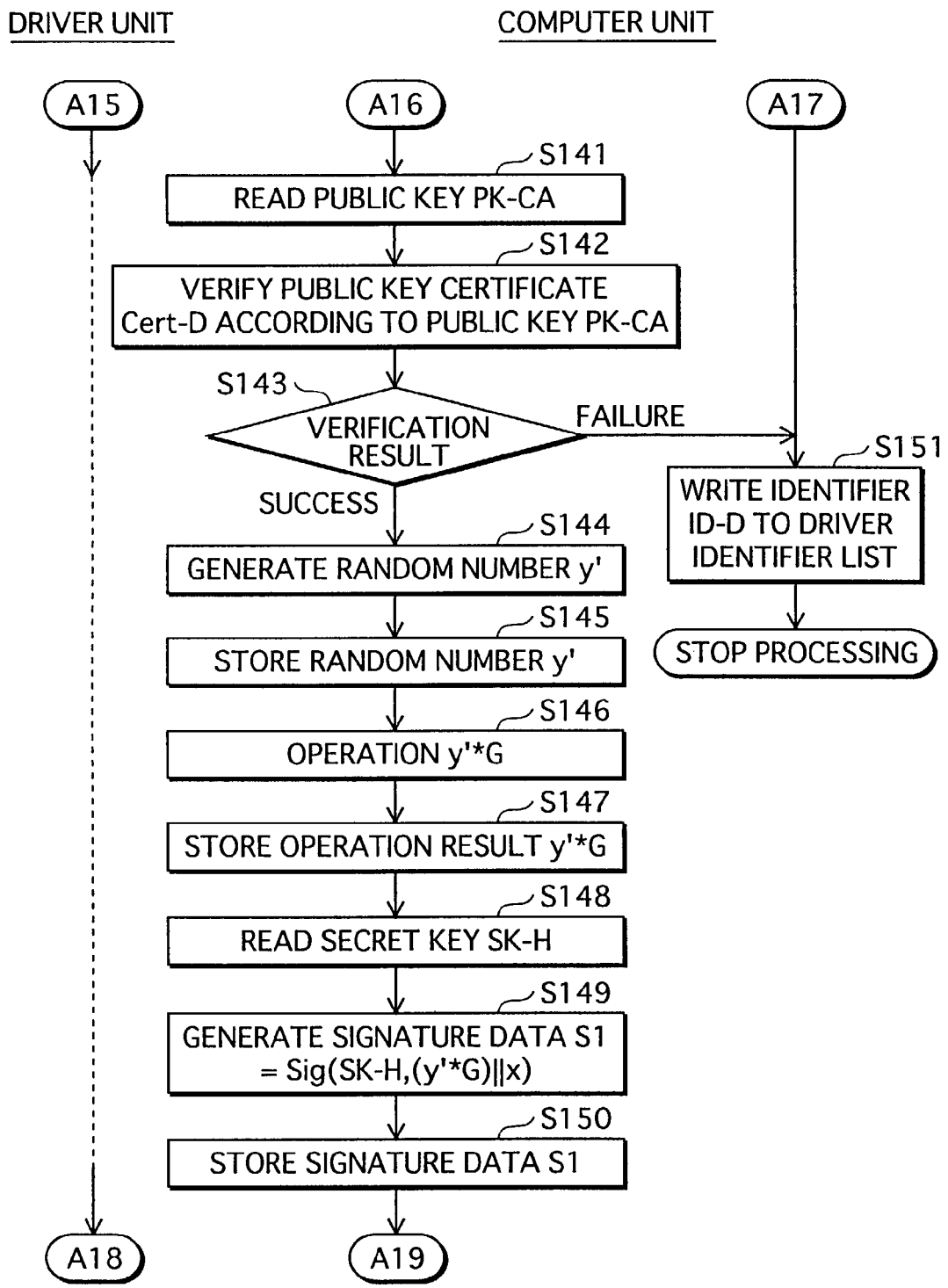
FIG. 13 is a flowchart showing operations between the driver unit 20 and the computer unit 30 in SAC setting processing, and in decrypting encrypted content that is recorded on a DVD 50, and continues in FIG. 14.
Figure 14:
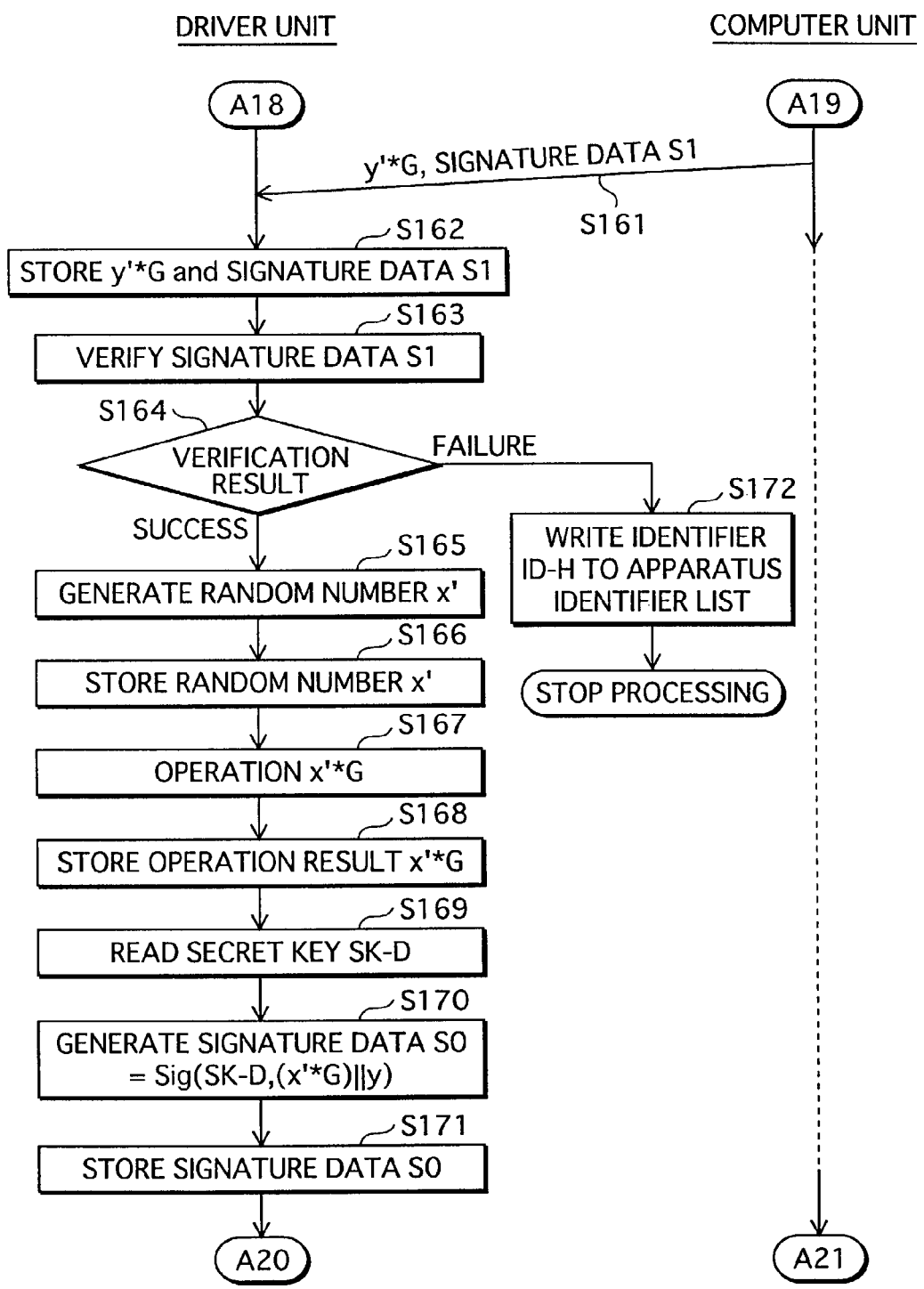
FIG. 14 is a flowchart showing operations between the driver unit 20 and the computer unit 30 in SAC setting processing, and in decrypting encrypted content that is recorded on a DVD 50, and continues in FIG. 15.
Figure 15:
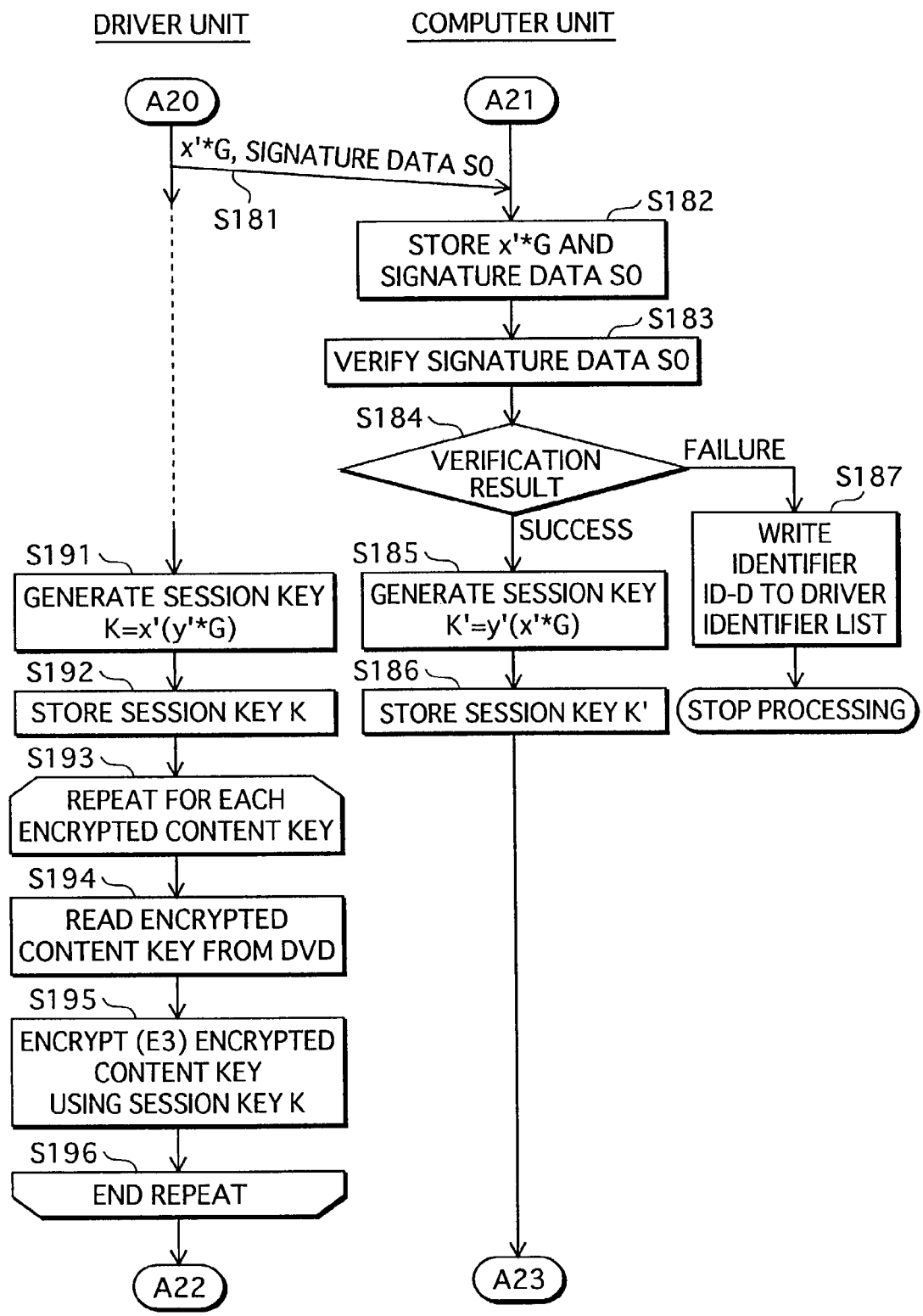
FIG. 15 is a flowchart showing operations between the driver unit 20 and the computer unit 30 in SAC setting processing, and in decrypting encrypted content that is recorded on a DVD 50, and continues in FIG. 16.
Figure 16:
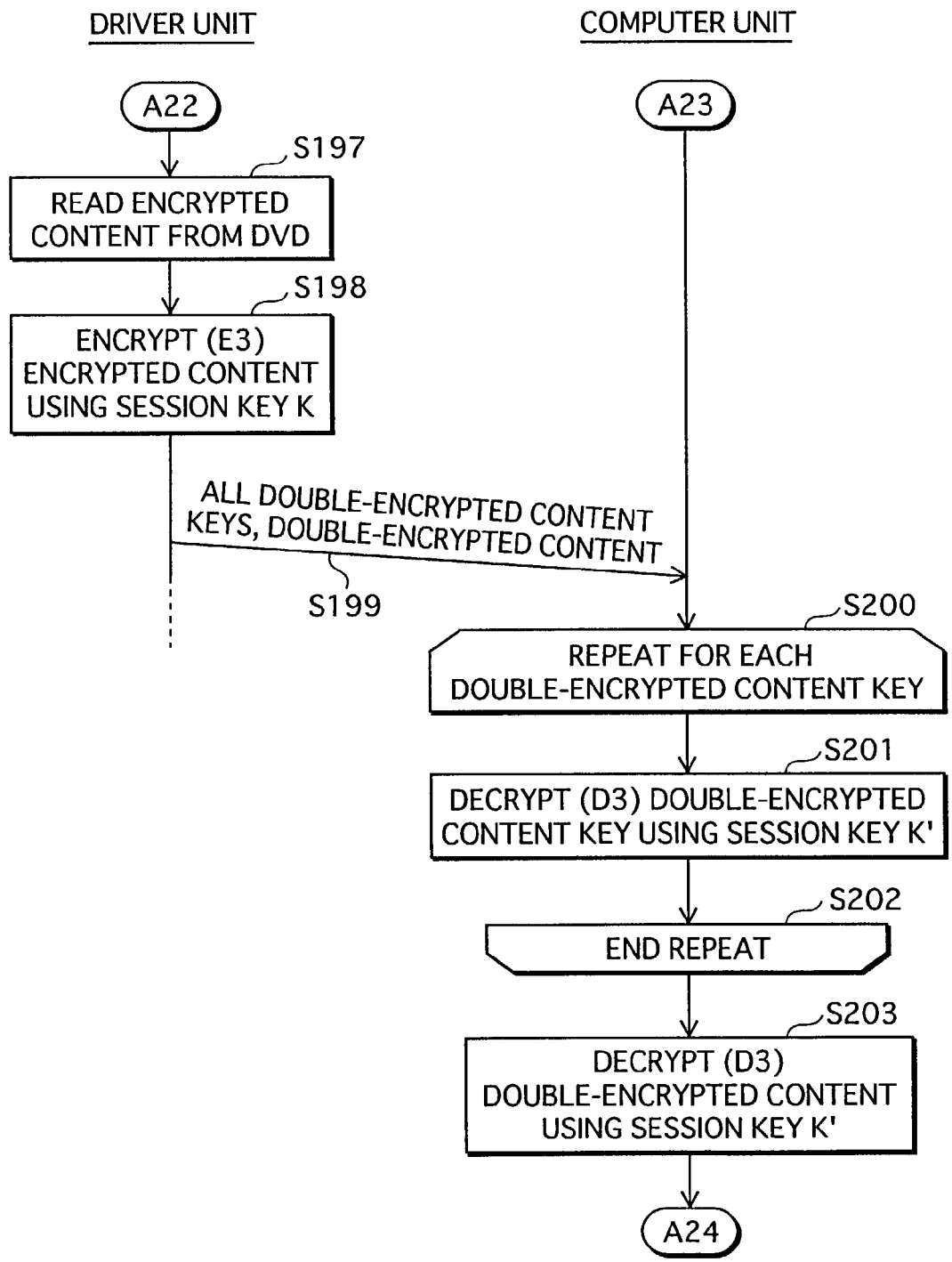
FIG. 16 is a flowchart showing operations between the driver unit 20 and the computer unit 30 in SAC setting processing, and in decrypting encrypted content that is recorded on a DVD 50, and continues in FIG. 17.
Figure 17:
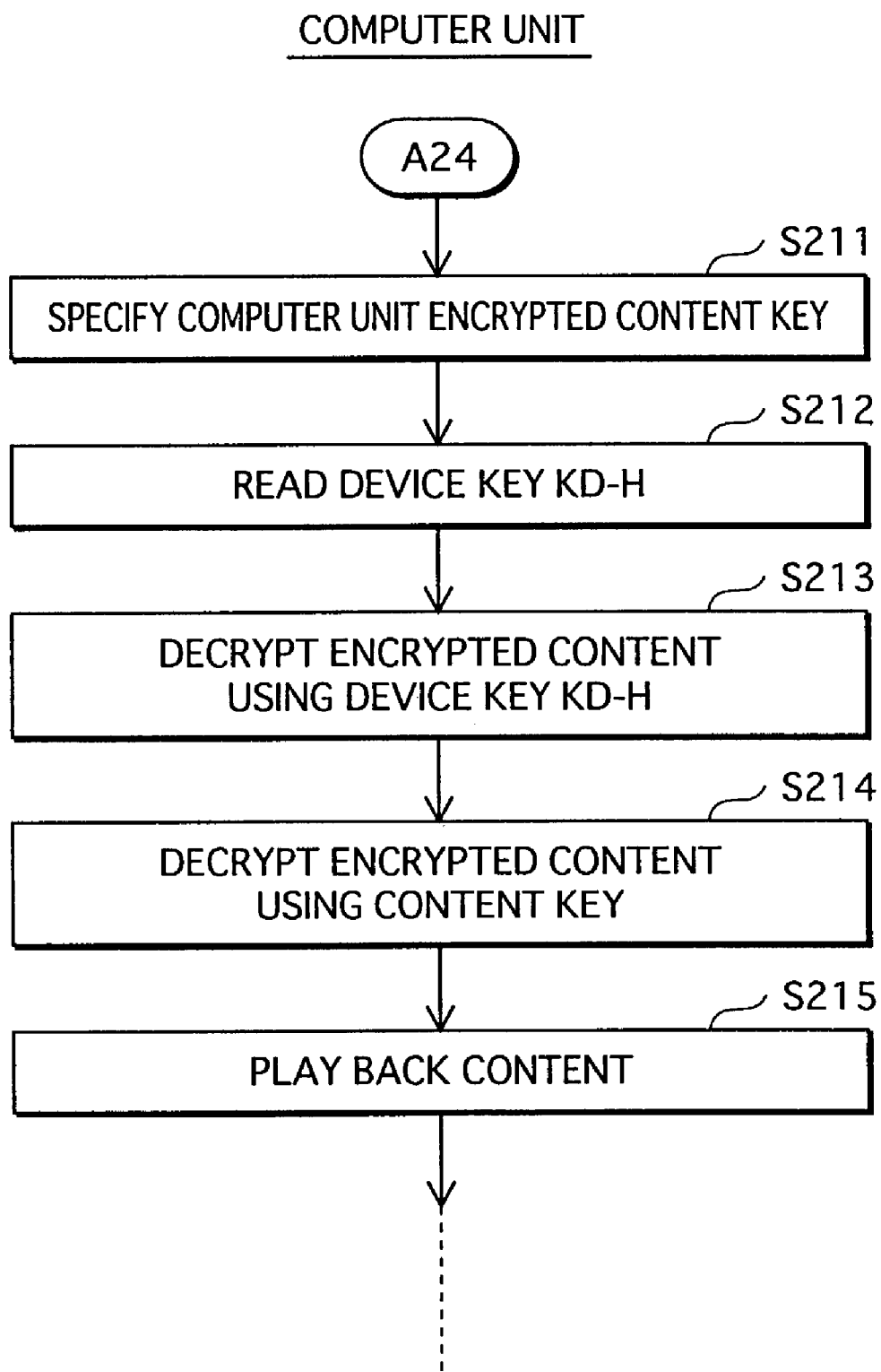
FIG. 17 is a flowchart showing operations between the driver unit 20 and the computer unit 30 in SAC setting processing, and in decrypting encrypted content that is recorded on a DVD 50, and continues from FIG. 16.

The identifier list storage unit 210 has an apparatus identifier list 231 of which one example is shown in FIG. 9. The apparatus identifier list 231 includes a plurality of identifiers.

Each identifier is the identifier of an opposite party device that was confirmed as being revoked when the driver unit 20 attempted to execute SAC setting processing. Note that the identifier list storage unit 210 has a structure that enables the apparatus identifier list 231 to be accessed only by authorized parties.

(4) Reading Unit 201

The reading unit 201 reads the driver revocation list CRL-D, the apparatus revocation list CRL-H, the encrypted content key bundle, and the encrypted content from the DVD 50, in the following way.

The reading unit 201 receives a read instruction showing reading of the drive revocation list CRL-D, from the authentication communication unit 208. On receiving the read instruction, the reading unit 201 reads the driver revocation list CRL-D from the DVD 50, and outputs the read driver revocation list CRL-D to the authentication communication unit 208.

Furthermore, the reading unit 201 receives a read instruction showing reading of the apparatus revocation list CRL-H, from the check unit 206. On receiving the read instruction, the read unit 201 reads the apparatus revocation list CRL-H from the DVD 50, and outputs the read apparatus revocation list CRL-H to the check unit 206.

Furthermore, the reading unit 201 reads the encrypted content key bundle from the DVD 50, and outputs the read encrypted content key bundle to the authentication communication unit 208. In addition, the reading unit 201 reads the encrypted content from the DVD 50, and outputs the read encrypted content to the authentication communication unit 208.

(5) Random Number Generation Unit 205

The random number generation unit 205 generates 160-bit random numbers x and x' as time-variable values, and writes the generated random numbers x and x' to the buffer memory 209.

(6) Check Unit 206

The check unit 206 receives the public key certificate Cert-H from the authentication communication unit 208, extracts the driver unit identifier TD-H from the read public key certificate Cert-H, and then judges whether the extracted identifier ID-H is judged to be included in the driver identifier list 231 stored in the identifier list storage unit 210. When the extracted identifier ID-H is included in the driver identifier list 231, the check unit 206 controls so that the authentication communication unit 208 stops communicating with the computer unit 30. When the extracted identifier ID-H is judged not to be included in the driver identifier list 231, the check unit 206 writes the received public key certificate Cert-H and the random number y to the buffer memory 209.

Furthermore, the check unit 206 generates a read instruction showing reading of the apparatus revocation list CRL-H, outputs the generated read instruction to the read unit 201, and then receives the apparatus revocation list CRL-H from the read unit 201. On receiving the apparatus revocation list CRL-H, the check unit 206 judges whether the extracted identifier ID-H is included in the received apparatus revocation list CRL-H. When the extracted identifier ID-H is judged not to be included in the apparatus revocation list CRL-H, the check unit 206 writes the extracted identifier ID-H to the apparatus identifier list 231 stored in the identifier list storage unit 210, and controls so that the authentication communication unit 208 stops communicating with the computer unit 30. When the extracted identifier ID-H is judged not to be included in the received apparatus revocation list CRL-H, the processing continues.

Furthermore, the check unit 206 receives verification failure information showing that verification has failed from the elliptic encryption processing unit 207. On receiving the verification failure information, the check unit 206 writes the extracted identifier ID-H to the apparatus identifier list 231 stored in the identifier list storage unit 210, and controls so that the authentication communication unit 208 stops communicating with the computer unit 30.

(7) Constant Storage Unit 212

The constant storage unit 212 stores a basepoint G on the elliptic curve in advance.

(8) Elliptic Encryption Processing Unit 207

The elliptic encryption processing unit 207 executes signature generation processing and key sharing processing according to elliptic curve encryption during authentication and the like in SAC setting processing, in the following way.

The elliptic encryption processing unit 207 reads the public key PK-CA from the public key storage unit 202, reads the public key certificate Cert-H from the buffer memory 209, and performs digital signature verification VER of the read public key certificate Cert-H, using the read public key PK-CA.

Here, the digital signature verification VER complies with the elliptic curve DSA signature method in which security is based on a discrete logarithm problem on the elliptic curve.

On failing in verification, the elliptic encryption processing unit 207 outputs failure information showing that verification has failed to the check unit 206. When verification succeeds, the processing continues.

The elliptic encryption processing unit 207 reads the operation result y'*G and the signature data S1 from the buffer memory 209, reads the public key certificate Cert-H from the buffer memory 209, extracts the public key PK-H from the read public key certificate Cert-H, and applies digital signature verification VER to the read operation result y'*G and signature data S1, using the extracted public key PK-H. When the verification result is failure, the elliptic encryption processing unit 207 outputs verification failure information showing verification failure to the check unit 206. In this case communication between the driver unit 20 and the computer unit 30 is stopped. When the verification result is success, the processing continues.

Furthermore, the elliptic encryption processing unit 207 reads the basepoint G 235 from the constant storage unit 212, reads the random number x' from the buffer memory 209, and performs a multiplication operation, on an elliptic curve, of the read basepoint G and the read random number x'. The elliptic encryption processing unit 207 then writes the operation result x'*G to the buffer memory 209.

Next, the elliptic encryption processing unit 207 reads the secret key SK-D from the secret key storage unit 203, reads the random number y from the buffer memory 209, applies a digital signature Sig using the read secret key SK-D, the operation result x'*G and the read random number y, to generate signature data S0, and writes the signature data S0 to the buffer memory 209.

$$S0 = Sig(SK\text{-}D, (x'^*G) \| y)$$

Here, the digital signature Sig is as described earlier.

Furthermore, the elliptic encryption processing unit 207 reads the random number x' and the operation result y'*G from the buffer memory 209, generates the session key K according to the following expression, and writes the generated session key K to the buffer memory 209.

$$K = x'(y'^*G)$$

The session key K generated in this way has the same value as the session key K' generated by the elliptic curve encryption processing unit 306. This is because $$K = x'(y'^*G) = y'(x'^*G) = K'$$

(9) Authentication Communication Unit 208

The authentication communication unit 208 controls authentication processing and the like when SAC setting processing is performed with the computer unit 30, as described below, while also being a communication interface unit for performing the necessary encryption processing in encryption communication after SAC setting processing.

The authentication communication unit 208 receives a read instruction showing reading of the driver revocation list CRL-D, from the authentication communication unit 307 of the computer unit 30 via the general-purpose communication path 61. On receiving the read instruction, the authentication communication unit 208 outputs the read instruction to the reading unit 201. Next, the authentication communication unit 208 receives the driver revocation list CRL-D from the reading unit 201, and outputs the received driver revocation list CRL-D to the computer unit 30 via the general-purpose communication path 61.

Furthermore, the authentication communication unit 208 receives the public key certificate Cert-H and the random number y from the authentication communication unit 307 via the general-purpose communication path 61, and outputs the received public key certificate Cert-H and random number y to the check unit 206.

Furthermore, the authentication communication unit 208 reads the public key certificate Cert-D from the certificate storage unit 204, reads the random number x from the buffer memory 209, and outputs the read public key certificate Cert-D and the random number x to the computer unit 30 via the general-purpose communication path 61.

Furthermore, authentication communication unit 208 receives the operation result y'*G and the signature data S1 from the authentication communication unit 307, and writes the received operation result y'*G and signature data S1 to the buffer memory 209.

The authentication communication unit 208 reads the operation result x'*G and the signature data S0 from the, buffer memory 209, and outputs the read operation result x'*G and signature data S0 to the computer unit 30 via the general-purpose communication path 61.

Furthermore, the authentication communication unit 208 receives the encrypted content key bundle from the reading unit 201, reads the session key K from the buffer memory 209, and applies the encryption algorithm E3 to each encrypted content key in the bundle using the read session key K, to generate a plurality of double-encrypted content keys. The authentication communication unit 208 then outputs the generated plurality of double-encrypted content keys to the computer unit 30 via the general-purpose communication path 61.

Furthermore, the authentication communication unit 208 receives the encrypted content from the reading unit 201, applies the encryption algorithm E3 to the encrypted content using the read session key K, to generate double-encrypted content, and outputs the generated double-encrypted content to the computer unit 30 via the general-purpose communication path 61.

Here, the encryption algorithm E3 is an algorithm called a secret key encryption method or a common key encryption method, and, specifically, complies to the AES method.

(10) Buffer Memory 209

The buffer memory 209 includes an area for holding an apparatus revocation list CRL-D received from the DVD 50, a random number generated by the random number generation unit 205, and temporary data generated by the elliptic encryption processing unit 207.

1.6 Operations of by the Driver Unit 20 and the Computer Unit 30

The following describes, with use of the flowcharts in FIGS. 10 to 17, operations between the driver unit 20 and the computer unit 30 for SAC setting processing, and for decrypting encrypted content recorded on the DVD 50.

Here, it is supposed that the drive revocation list CRL-D, the apparatus revocation list CRL-H, the encrypted content key bundle, and the encrypted content have been recorded on the DVD 50 by the disk manufacturing apparatus 10.

On receiving playback instruction to playback the encrypted content recorded on the DVD 50, according to an operation by the user (step S101), the authentication communication unit 307 of the computer unit 30 outputs a read instruction to read the driver revocation list CRL-D to the driver unit 20 (step S102). The reading unit 201 reads the driver revocation list CRL-D from the DVD 50 (step S103), the authentication communication unit 208 outputs the driver revocation list CRL-D to the computer unit 30, the authentication communication unit 307 receives the driver revocation list CRL-D (step S104), and stores the received driver revocation list CRL-D in the buffer memory 308 (step S105).

The random number generation unit 304 of the computer unit 30 generates a random number y (step S106), and stores the generated random number y in the buffer memory 308 (step S107). Next, the authentication communication unit 307 of the computer unit 30 reads the random number y from the buffer memory 308, reads the public key certificate Cert-H from the certificate storage unit 303 (step S108), and transmits the random number y and the public key certificate Cert-H to the driver unit 20 (step S109).

The check unit 206 extracts the identifier ID-H from the public key certificate Cert-H (step S110), and checks with use of the extracted identifier ID-H whether the computer unit 30 is revoked or not, based on the apparatus identifier list 231 stored in the identifier list storage unit 210 (step S111). When the check shows that the computer unit 30 is revoked (step S112), the processing stops here.

When the check shows that the computer unit 30 is not revoked (step S112), the authentication communication unit 208 of the driver unit 20 stores the random number y and the public key certificate Cert-H received from the computer unit 30 in the buffer memory 209 (step S113).

Next, the check unit 206 reads the apparatus revocation list CRL-H recorded on the DVD 50, via the reading unit 201 (step S114), and checks, with use of the extracted identifier ID-H, whether the computer unit 30 is revoked or not, based on the apparatus revocation list CRL-H (step S121).

When the identifier ID-H of the computer unit 30 is judged to be on the apparatus revocation list CRL-H (step S122), the check unit 206 adds the computer unit 30 identifier ID-H to the apparatus identifier list 231 stored in the identifier list storage unit 210 (step S129), and subsequently stops processing.

When the identifier ID-H of the computer unit 30 is judged not to be on the apparatus revocation list CRL-H (step S122), the elliptic encryption processing unit 207 reads the CA public key PK-CA (step S123), and performs verification of the public key certificate Cert-H using the public key PK-CA (step S124). When verification fails (step S125), the processing moves to step S129, and then stops.

When verification succeeds (step S125), the random number generation unit 205 generates a random number x (step S126), and stores the generated random number x in the buffer memory 209 (step S127). Next, the authentication communication unit 208 reads the random number x from the buffer memory 209, reads the public key certificate Cert-D from the certificate storage unit 204 (step S128), and transmits the random number x and the public key certificate Cert-D to the computer unit 30 (step S131).

The authentication communication unit 307 in the computer unit 30 stores the random number x and the public key certificate Cert-D received from the driver unit 20 in the buffer memory 308 (step S132). The check unit 305 extracts the identifier ID-D from the public key certificate Cert-D (step S133), and checks whether the driver unit 20 is revoked or not by judging whether the extracted identifier ID-D is included in the driver identifier list 331 stored in the identifier list storage unit 309 (step S134). When the extracted identifier TD-D is judged to be in the driver identifier list 331 (step S135), processing stops.

When the extracted identifier ID-D is judged not to be in the driver identifier list 331 (step S135), the check unit 305 checks whether the driver unit 20 is revoked or not by judging whether the extracted identifier ID-D is included in the received driver revocation list CRL-D (step S136). When the extracted identifier ID-D is judged to be in the received driver revocation list CRL-D (step S137), the check unit 305 adds the identifier ID-D of the driver unit 20 to the driver identifier list 331 stored in the identifier list storage unit 309 (step S151), and stops processing.

When the check unit 305 judges that the extracted identifier ID-D is not included in the driver revocation list CRL-D (step S137), the elliptic encryption processing unit 306 reads the CA public key PK-CA (step S141), and verifies the public key certificate Cert-D using the read public key PK-CA (step S142). When verification fails (step S143), the processing moves to step S151, and then stops.

When the elliptic encryption processing unit 306 succeeds in verification (step S143), the random number generation unit 304 generates a random number y' (step S144), and stores the generated random number y' to the buffer memory 308 (step S145). Next, the elliptic encryption processing unit 306 performs a scalar multiplication operation, on an elliptic curve, of the random number y' and the base point G to generate an operation result y'*G (step S146), and stores the operation result y'*G in the buffer memory 308 (step S147). Next, the elliptic encryption processing unit 306 reads the secret key SK-H (step S148), generates signature data S1=Sig(SK-H,(y'*G) ||x) for the operation result y'*G (step S149), and stores the signature data S1 in the buffer memory 308 (step S150). Next, the authentication communication unit 307 transmits the operation result y'*G and the signature data S1 to the driver unit 20 (step S161).

The authentication communication unit 208 of the driver unit 20 stores the y'*G and the signature data S1 in the buffer memory 209 (step S162), and the elliptic encryption processing unit 207 verifies that the signature data S1 is the signature of the computer unit 30 for (y'*G)||x, using the public key PK-H extracted from the public key certificate Cert-H. Specifically, the elliptic encryption processing unit 207 verifies by deciphering the signature data S1 with the public key PK-H, and separating the concatenated bits of y'*G and the random number x. This enables the elliptic encryption processing unit 207 to confirm that the computer unit 30 is not eavesdropping or the like (step S163). When the elliptic encryption processing unit 207 fails in verification (step S164), the check unit 206 adds the identifier ID-H to the apparatus identifier list 231 stored in the identifier list storage unit 210 (step S172), and the processing stops.

When the elliptic encryption processing unit 207 succeeds in verification (step S164), the random number generation unit 205 of the driver unit 20 generates a random number x' (step S165), and stores the generated random number x' in the buffer memory 209 (step S166). Next, the elliptic encryption processing unit 207 performs a scalar multiplication, on an elliptic curve, of the random number x' and the basepoint G to generate an operation result x'*G (step S167), and stores the generated operation result x'*G to the buffer memory 209 (step S168). The elliptic encryption processing unit 207 then reads the secret key SK-D (step S169), generates signature data S0=Sig(SK-D,(x'*G)||y) for the operation result x'*G (step S170), and stores the generated signature data S0 in the buffer memory 209 (step S171). The signature data S0 is generated by concatenating bits of a random number y with the operation result x'*G, and digitally signing the resulting data using the secret key SK-D stored in the secret key storage unit 203. Next, the authentication communication unit 208 transmits the operation result x'*G and the signature data S0 to the computer unit 30 (step S181).

The authentication communication unit 307 of the computer unit 30 stores the operation result x'*G and the signature data S0 received from the driver unit 20 in the buffer memory 308 (step S182), and the elliptic encryption processing unit 306 verifies that the signature data S0 is the signature of the driver unit 20 for (x'*G)||y, using the public key PK-D extracted from the public key certificate Cert-D. Specifically, the elliptic encryption processing unit 306 verifies by deciphering the signature data S0 with the public key PK-H, and separating the concatenated bits of y'*G and the random number x. This enables the elliptic encryption processing unit 306 to confirm that the driver unit 20 is not eavesdropping or the like (step S183).

When the elliptic encryption processing unit 306 fails in verification (step S184), the check unit 305 adds the identifier ID-D to the drive identifier list 331 stored in the identifier list storage unit 309 (step S187), and the processing then ends.

On succeeding in verification (step S184), the elliptic encryption processing unit 306 performs a scalar multiplication operation K'=y'(x'*G) with the random number y' stored in the buffer memory 308 and the operation result x'*G received from the opposite party (step S185), and stores calculation result K' in the buffer memory 308 as a session key K' (step S186).

Meanwhile, the elliptic encryption processing unit 207 of the driver unit 20 performs a scalar multiplication operation K=x'(y'*G) with the random number x' stored in the buffer memory 209 and the operation result y'*G received from the opposite party (step S191), and stores the calculation result K in the buffer memory 209 as the session K (step S192).

As a result of the above-described operations, the driver unit 20 and the computer unit 30 each have a key K(=K') of the same value, and subsequently perform encryption communication using K(=K') as the session key.

When generation of the session key K has finished, the authentication communication unit 208 of the driver unit 20 reads the encrypted content key bundle recorded on the DVD 50, via the reading unit 201, and double-encrypts the encrypted content key bundle using the session key K (step S193-S196). Next, the authentication communication unit 208 reads the encrypted content recorded on the DVD 50, via the reading unit 201 (step S197), and double-encrypts the encrypted content with the session key K (step S198). Here, either a secret key encryption method or a common key encryption method is used in encrypting the encrypted content bundle and the encrypted content. Specifically, the AES method described earlier is used.

Next, the authentication communication unit 208 transmits the double-encrypted content key bundle and the double encrypted content to the computer unit 30 (step S199).

This process ensures that eavesdropping or the like on the encrypted content keys and the encrypted content is prevented.

The authentication communication unit 307 of the computer unit 30 decrypts the double encrypted content key bundle received from the driver unit 20 with the session key K', to obtain an encrypted content key bundle (step S200 to S202), and decrypts the double encrypted content with the session key K', to obtain encrypted content (step S203).

Next, the decryption unit 311 retrieves the encrypted content key that is for use by the computer unit 30 from a predetermined place in the encrypted content key bundle (step S211), reads the device key KD-H from the device key storage unit 310 (step S212), and decrypts the extracted encrypted content key using the read device key KD-H, to generate a content key Kc (step S213). The decryption unit 311 then outputs the generated content key Kc to the decryption unit 312, and the decryption unit 312 decrypts the encrypted content using the generated content key Kc, to generate content (step S214). The playback unit 313 plays back, and then outputs, the content (step S215).

In this way, content can be decrypted while increasing protection of the copyright of the content.

1.7 Modifications

The present invention is not limited to the above-described embodiment. The following cases are included in the present invention.

(1) The computer unit 30 in the above-described embodiment may, for example, be realized by software that is executed in a personal computer.

Furthermore., although the driver unit 20 and the computer unit 30 are contained in the personal computer 60 in the above-described embodiment, the personal computer 60 may contain the computer unit 30 and be connected to an external driver unit 20 via a general-purpose communication path.

(2) In the above-described embodiment, the computer unit 30 checks the validity of the public key certificate of the driver unit 20, which is the opposite party, based on the driver revocation list CRL-D recorded on the DVD 50. Here, the computer unit 30 may have an internal CRL storage unit, write the most newly obtained driver revocation list CRL-D to the CRL storage unit, and check the validity of the public key certificate of the opposite party using the stored newly obtained driver revocation list CRL.

In this case, it is not necessary for the computer unit 30 to have a identifier list storage unit 309. However, as the number of revoked devices increases and the size of the driver revocation list CRL-D increases, the time required to search the driver revocation list CRL-D also increases. For this reason, a check can be performed more quickly if priority is given to checking the revoked drivers from which the computer unit 30 has received an authentication request in the past. In this sense, it is valuable to have the revoked driver identifier list CRL-D stored in the identifier list storage unit 309.

The above-described points also apply to the driver unit 20.

(3) In the above-described embodiments, the apparatus identifier list 231 stored in the identifier list storage unit 210 in the driver unit 20 includes identifiers of revoked computer units. There are cases in which the identifier ID-H of the computer unit 30, which is the opposite party, is added to the apparatus identifier list 231 when the identifier ID-H is on the apparatus revocation list CRL-H and is not on the apparatus identifier list 231. Furthermore, the identifier ID-H is added to the apparatus identifier list 231 only when the driver unit 20 performs SAC setting processing with the computer unit 30.

Here, the following structure is possible. The identifier list storage unit 210 has an apparatus identifier list 231b shown in FIG. 18, instead of the apparatus identifier list 231. As shown in FIG. 18, the apparatus identifier list 231b includes a plurality of pieces of apparatus distinction information, each composed of an identifier and validity distinction in formation. The identifier identifies a computer unit, and the validity distinction information shows whether the computer unit identified by the identifier is valid or revoked.

When performing SAC setting processing with an opposite party, the check unit 206 in the driver unit 20 generates validity distinction information showing that the opposite party public key certificate is valid when the opposite party public key certificate is valid, and validity distinction information showing that the opposite party public key certificate is revoked when the opposite party public key certificate is revoked. The check unit 206 then writes the apparatus distinction information, which is composed of the opposite party identifier and the generated validity distinction in formation, to the apparatus identifier list 231b. Here, if apparatus distinction information that includes the opposite party's identifier is included in the apparatus identifier list 231b, the check unit 206 overwrites the apparatus distinction information that is made up of the communication party's identifier and the generated validity distinction information.

Furthermore, when checking whether the opposite party's identifier is in the apparatus revocation list CRL-H, the check unit 206 may check whether each identifier in the apparatus identifier list 231b is in the apparatus revocation list CRL-H in which the identifier is included, and, based on the result, update the validity distinction information corresponding to each identifier in the apparatus identifier list 231b.

In the same way, the identifier list storage unit 309 in the computer unit 30 may have a driver identifier list 331b as shown in FIG. 19, instead of the driver identifier list 331. Here, driver identifier list 331b includes a plurality of pieces of driver distinction information, each of which is composed of an identifier and validity distinction information. The check unit 305 operates in the same manner as described above for the check unit 206.

Furthermore, the apparatus identifier list may be composed of a valid list and a revoked list, the valid list including identifiers of only valid devices, and the revoked list including identifiers of only revoked devices. This also applies to the driver identifier list.

(4) In the above-described embodiment, the identifier list storage unit 309 of the computer unit 30 has a structure that enables the driver identifier list 331 to be accessed only by authorized parties.

However, the identifier list storage unit 309 is not limited to being accessed only by authorized parties, and may have a structure that enables access by anyone. In this case, the driver identifier list 331 may include a plurality of encrypted identifiers that have been generated by encrypting identifiers using as a key the device key KD-H stored in the device key storage unit 310.

Here, the check unit 305 decrypts the encrypted identifiers using the device key KD-H as the key, to generate identifiers for use.

In order to prevent tampering with the driver identifier list 331, a hash function, for example SHA-1, may be applied to all identifiers in the driver identifier list 331 to generated a first hash value, and the generated first hash value may be stored in an area that can be accessed only by authorized parties.

Here, the check unit 305 reads the first hash value, applies a unidirectional function, for example a hash function such as SHA-1, to the identifiers in the driver identifier list 331, to generate a second hash value, compares the read first hash value and the generated second hash value, and uses all the identifiers in the driver identifier list 331 when the first and second values match. When the first and second values do not match, the check unit 305 does not use all the identifiers in the driver identifier list 331.

The apparatus identifier list 231 in the identifier list storage unit 210 in the driver unit 20 may have the same kind of structure as that described above.

(5) In the above-described embodiment, when generating the session key, the driver unit 20 and the computer unit 30 generate random numbers x' and y' respectively to share session keys. However, session key sharing is not limited to this method. A key sharing method by which the respective public keys and secret keys are combined may be used.

(6) The present invention may be methods shown by the above. Furthermore, the methods may be a computer.

Furthermore, the present invention may be a computer-readable recording medium such as a flexible disk, a hard disk, a CD-ROM (compact disk-read only memory), an MO (magneto-optical), a DVD (digital versatile disk), a DVD-ROM (digital versatile disk-read only memory), a DVD RAM (digital versatile disk-random access memory), a BD (Blu-Ray Disc) or a semiconductor memory, that stores the computer program. Furthermore, the present invention may be the computer program recorded on any of the aforementioned recording medium apparatuses (i.e., non-transitory computer-readable storage mediums).

Furthermore, the present invention may be a computer system that includes a microprocessor and a memory, the memory storing the computer program, and the microprocessor operating according to the computer program.

(7) The present invention may be any combination of the above-described embodiments and modifications.

1.8 Overall Summary

As has been described, the present invention is an authentication communication apparatus that authenticates an opposite party, using a public encryption key, and communicates with the opposite party. The authentication apparatus includes a communication unit that communicates with one or more external device including at least the opposite party; a validity check unit that judges validity of the opposite party; a revoked device identifier storage unit that stores, as a set, an identifier of a past opposite party with which communication has been performed in the past, and validity distinction information showing validity of a public key certificate of the past opposite party; and a verification processing unit that performs verification processing for authenticating whether or not the opposite party is a legal opposite party. Here, the validity check unit further, when an identifier of the opposite party is an identifier stored in the revoked device identifier storage unit, checks the validity distinction information stored as a set with the identifier of the opposite party, and checks whether or not the opposite party is a revoked device.

Furthermore, the validity check unit, when checking a revoked device list obtained from an external source via the communication unit, if the identifier of the past opposite party stored in the revoked device identifier storage unit is included in the revoke device list, further rewrites the validity distinction information stored as a set in the revoked device identifier storage unit with the identifier of the opposite party, to show revoked.

Furthermore, the present invention is an authentication communication apparatus that authenticates an opposite party, using a public encryption key, and communicates with the opposite party. The authentication apparatus is composed of a communication unit that communicates with one or more external device including at least the opposite party; a public key certificate confirmation unit that confirms a first public key certificate that is sent from the opposite party, the first public key certificate certifying that the public key of the opposite party is the public key of the opposite party; a public key revocation list check unit that judges validity of the public key certificate of the opposite party according to a public key certificate revoked device list showing one or more revoked public key certificates; a revoked device identifier storage unit that, when the public key revocation list check unit judges that the first public key certificate is revoked, stores the identifier of the opposite party included in the first public key certificate, as a revoked device identifier; and a verification processing unit that performs processing for verifying whether or not the opposite party is an opposite party listed in the first public key certificate. Here, in addition to judging the validity of the public key certificate of the opposite party during communication according to the public key certificate revocation device list, the public key revocation list check unit checks whether or not the identifier of opposite party is the revoked device identifier stored in the revoked device identifier storage unit.

Furthermore, the present invention is an authentication communication apparatus that authenticates an opposite party using a public encryption key, and communicates with the opposite party. The authentication apparatus is composed of a communication unit that communicates with one or more external device including at least the opposite party; a public key certificate confirmation unit that confirms a first public key certificate that is sent from the opposite party and that is for certifying that the public key of the opposite party is the public key of the opposite party; a public key revocation list check unit that judges validity of the public key certificate of the opposite party according to a public key certificate revoked device list showing one or more revoked public key certificates; a revoked device identifier storage unit that stores, as a set, an identifier of a past opposite party with which communication has been performed in the past included in the first public key certificate of the past opposite party, and validity distinction information that lists validity of the public key certificate of the past opposite party; and a verification processing unit that performs verification processing for verifying whether or not the opposite party is an opposite party listed in the first public key certificate. Here, in addition to judging the validity of the public key certificate of the opposite party during communication according to the public key certificate revocation device list, when the identifier of the opposite party is an identifier stored in the revoked device identifier storage unit, the public key revocation list check unit checks the validity distinction information stored as a set with the identifier of the opposite party, and checks whether or not the opposite party is a revoked device.

Here, the authentication communication apparatus further includes a secret key storage unit that stores secret key information used in public key encryption processing for certifying an identity of the authentication communication apparatus to the opposite party; a public key certificate storage unit that stores a second public key certificate for certifying to the opposite party that the public key of the authentication communication apparatus is the public key of the authentication communication apparatus; and a certificate processing apparatus that performs certification processing for certifying to the opposite party that the authentication communication apparatus is an apparatus listed in the second public key certificate.

Here, the public key certificate confirmation unit further holds in advance a public key of a public key certification authority that issued a public key certificate for confirming the first public key certificate.

Here, the public key certificate confirmation unit further obtains via the communication unit a public key of a public key certification authority that issued a public key certificate for confirming the first public key certificate.

Here, the public key revocation list check unit further obtains the public key certificate revoked device list via the communication unit.

Here, the authentication communication apparatus further includes a recording medium reading unit that reads information written to a recording medium; and the public key revocation list check unit further obtains the public key certificate revoked device list from the recording medium.

Here, as the verification processing, the verification processing unit generates certification confirmation information, sends the certification confirmation information to the opposite party via the communication unit, and verifies that first certification information sent from the opposite party is certification information of the opposite party for information included in the certification confirmation information.

Here, as the certification processing, the certification processing unit generates second certification information, using the secret key information stored in the secret key storage unit, for information included in the certification confirmation information sent from the opposite party, and transmits the second certification information to the opposite party via the communication unit.

Here, the public key revocation list check unit further, when checking the public key certificate revoked device list, if the identifier of the past opposite party stored in the revoked device identifier storage unit is included in the revoked device list, rewrites the validity distinction information stored in the revoked device identifier storage unit as a set with the identifier of the opposite party to show revoked.

Here, the authentication communication apparatus further includes an encryption/decryption unit that encrypts or decrypts information based on a unique key of the authentication communication apparatus. The information stored in the revoked device identifier storage unit is encrypted by the encryption/decryption unit, and stored.

Here, the authentication communication apparatus further includes an attribute value calculation unit that calculates a revoked device identifier attribute value that depends on contents of the information stored in the revoked device identifier storage unit; and a restricted-access storage unit that is readable and writable only with permission, wherein the revoked device identifier attribute value is stored in the restricted-access storage unit.

Furthermore, the present invention is an authentication communication system in which a first authentication communication device authenticates legality of a second authentication communication device using public key encryption, and the first authentication communication device and the second authentication communication device communicate. The first authentication communication device includes a first communication unit that communicates with one or more external device including at least the second authentication communication device; a first public key certificate confirmation unit that confirms a second public key certificate that is sent from the second authentication communication device, the second public key certificate certifying that a public key of the second authentication communication device is the public key of the second authentication device; a first public key revocation list check unit that judges validity of a public key certificate of the second authentication communication device according to a public key certificate revoked device list that shows at least one revoked public key certificate; a first revoked device identifier storage unit that, when the first public key revocation list check unit judges that the second public key certificate is revoked, stores an identifier of the opposite party included in the second public key certificate, as a revoked device identifier; and a first verification processing unit that performs verification processing for verifying whether or not the second authentication communication device is an opposite party shown in the second public key certificate. The second authentication communication device includes a second communication unit that communicates with one or more external device including at least the first authentication communication device; a second secret key storage unit that stores secret key information that is used in public key encryption processing for certifying an identity of the second authentication communication device to the first authentication communication device; a second public key certificate storage unit that stores a second public key certificate for certifying to the first authentication communication device that the public key of the second authentication communication device is the public key of the second authentication communication device; and a second certification processing unit that performs certification processing for certifying to the first authentication communication device that the second authentication communication device is a device shown in the second public key certificate. The first public key revocation list check unit further, in addition to judging during communication validity of the public key certificate of the second authentication communication device according to the public key certificate revoked device list, checks whether or not an identifier of an opposite party is a revoked device identifier stored in the first revoked device identifier storage unit.

Furthermore, the present invention is an authentication communication system in which a first authentication communication device authenticates legality of a second authentication communication device using public key encryption, and the first authentication communication device and the second authentication communication device communicate. The first authentication communication device includes a first communication unit that communicates with one or more external device including at least the second authentication communication device; a first public key certificate confirmation unit that confirms a second public key certificate that is sent from the second authentication communication device and that certifies that a public key of the second authentication communication device belongs to the second authentication device; a first public key revocation list check unit that judges validity of a public key certificate of the second authentication communication device according to a public key certificate revoked device list that shows at least one revoked public key certificate; a first revoked device identifier storage unit that stores, as a set, an identifier of a past opposite party with which communication has been performed in the past that is included in the second public key certificate of the past opposite party, and first validity information that shows validity of the public key certificate of the past opposite party; and a first verification processing unit that performs verification processing for verifying whether the second authentication communication device is an opposite party shown in the second public key certificate. The second authentication communication device includes a second communication unit that communicates with one or more external device including at least the first authentication communication device; a second secret key storage unit that stores secret key information used in public key encryption processing for certifying an identity of the second authentication communication device to the first authentication communication device; a second public key certificate storage unit that stores a second public key certificate for certifying to the first authentication communication device that the public key of the second authentication communication device is the public key of the second authentication communication device; and a second certification processing unit that performs certification processing for certifying to the first authentication communication device that the second authentication communication device is a device shown in the second public key certificate. The first public key revocation list check unit further, in addition to judging during communication validity of the public key certificate of the second authentication communication device according to the public key certificate revoked device list, when an identifier of the second authentication communication processing device is the identifier stored in the first revoked device identifier storage unit, checks the first validity distinction information stored as a set with the identifier of the second authentication communication device, and checks whether or not the second authentication communication device is a revoked device.

Furthermore, the present invention is an authentication communication system in which a first authentication communication device and a second authentication communication device authenticate each other's legality using public key encryption, and communicate with each other. The first authentication communication device includes a first communication unit that communicates with one or more external device including at least the second authentication communication device; a first secret key storage unit that stores secret key information that is used in public key encryption processing for certifying an identity of the first authentication communication device to the second authentication communication device; a first public key certificate storage unit that stores a first public key for certifying to the second authentication communication device that the public key of the first authentication communication device is the public key of the first authentication communication device; a first certificate processing unit that performs certification processing for certifying to the second authentication communication device that the first authentication communication device is the device shown in the first public key certificate; a first public key certificate confirmation unit that confirms a second public key certificate that is sent from the second authentication communication device, the second public key certificate certifying that certifies that a public key of the second authentication communication device is the public key of the second authentication device; a first public key revocation list check unit that judges validity of a public key certificate of the second authentication communication device according to a public key certificate revoked device list that shows at least one revoked public key certificate; a first revoked device identifier storage unit that, when the first public key revocation list check unit judges that the second public key certificate is revoked, stores an identifier of the opposite party included in the second public key certificate, as a revoked device identifier; and a first verification processing unit that performs verification processing for verifying whether or not the second authentication communication device is an opposite party shown in the second public key certificate. The second authentication communication device includes a second communication unit that communicates with one or more external device including at least the first authentication communication device; a second secret key storage unit that stores secret key information that is used in public key encryption processing for certifying an identity of the second authentication communication device to the first authentication communication device; a second public key certificate storage unit that stores a second public key certificate for certifying to the first authentication communication device that the public key of the second authentication communication device is the public key of the second communication device; a second certification processing unit that performs certification processing for certifying to the first authentication communication device that the second authentication device is the device shown in the second public key certificate; a second public key certificate confirmation unit that confirms a first public key certificate that is sent from the first authentication communication device, the first public key certificate certifying that a public key of the first authentication communication device is the public key of the first authentication device; a second public key revocation list check unit that judges validity of a public key certificate of the first authentication communication device according to a public key certificate revoked device list that shows at least one revoked public key certificate; a second revoked device identifier storage unit that, when the second public key revocation list check unit judges that the first public key certificate is revoked, stores an identifier of the opposite party included in the first public key certificate, as a revoked device identifier; and a second verification processing unit that performs verification processing for verifying whether or not the first authentication communication device is an opposite party shown in the first public key certificate. The first public key revocation list check unit further, in addition to judging during communication validity of the public key certificate of the second authentication communication device according to the first public key certificate revoked device list, checks whether or not an identifier of an opposite party is a revoked device identifier stored in the first revoked device identifier storage unit. The second public key revocation list check unit further, in addition to judging during communication validity of the public key certificate of the first authentication communication device according to the public key certificate revoked device list, checks whether or not an identifier of an opposite party is a revoked device identifier stored in the second revoked device identifier storage unit.

Furthermore, the present invention is an authentication communication system in which a first authentication communication device and a second authentication communication device authenticate each other's legality using public key encryption, and communicate with each other. The first authentication communication device includes a first communication unit that communicates with one or more external device including at least the second authentication communication device; a first secret key storage unit that stores secret key information that is used in public key encryption processing for certifying an identity of the first authentication communication device to the second authentication communication device; a first public key certificate storage unit that stores a first public key certificate for certifying an identity of the first authentication communication device to the second authentication communication device; a first certification processing unit that performs certification processing for certifying to the second authentication communication device that the first authentication device is the device shown in the first public key certificate; a first public key certificate confirmation unit that confirms a second public key certificate that is sent from the second authentication communication device, the second public key certificate certifying that a public key of the second authentication communication device is the public key of the second authentication device; a first public key revocation list check unit that judges validity of the public key certificate of the second authentication communication device according to a second public key certificate revoked device list that shows at least one revoked public key certificate; a first revoked device identifier storage unit that stores, as a set, an identifier of a past opposite party with which communication has been performed in the past included in the first public key certificate of the past opposite party, and validity distinction information that lists validity of a public key certificate of the past opposite party; and a first verification processing unit that performs verification processing for verifying whether or not the second authentication communication device is an opposite party shown in the second public key certificate. The second authentication communication device includes a second communication unit that communicates with one or more external device including at least the first authentication communication device; a second secret key storage unit that stores secret key information that is used in public key encryption processing for certifying an identity of the second authentication communication device to the first authentication communication device; a second public key certificate storage unit that stores a second public key certificate for certifying to the first authentication communication device that the public key of the second authentication communication device is the public key of the second authentication communication device; a second certification processing unit that that performs certification processing for certifying to the first authentication communication device that the second authentication device is the device shown in the second public key certificate; a second public key certificate confirmation unit that confirms a first public key certificate that is sent from the first authentication communication device, the first public key certificate certifying that a public key of the first authentication communication device is the public key of the first authentication device; a second public key revocation list check unit that judges validity of a public key certificate of the first authentication communication device according to a public key certificate revoked device list that shows at least one revoked public key certificate; a second revoked device identifier storage unit that stores, as a set, an identifier of a past opposite party with which communication has been performed in the past included in the second public key certificate of the past opposite party, and validity distinction information that lists validity of a public key certificate of the past opposite party; and a second verification processing unit that performs verification processing for verifying whether or not the first authentication communication device is an opposite party shown in the first public key certificate. In addition to judging the validity of the public key certificate of the second authentication communication device during communication according to the public key certificate revocation device list, when the identifier of the second authentication communication device is an identifier stored in the revoked device identifier storage unit, the first public key revocation list check unit checks the validity distinction information stored as a set with the identifier of the second authentication communication device, and checks whether or not the second authentication communication device is a revoked device. In addition to judging the validity of the public key certificate of the first authentication communication device during communication according to the public key certificate revocation device list, when the identifier of the first authentication communication device is an identifier stored in the revoked device identifier storage unit, the second public key revocation list check unit checks the validity distinction information stored as a set with the identifier of the first authentication communication device, and checks whether or not the first authentication communication device is a revoked device.

Here, the first authentication communication device further includes a first common key generation unit that generates a first common key from the first secret key stored in the first secret key storage unit and information that includes a public key of the second authentication device that is included in the second public key certificate that is sent from the second authentication communication device. The second authentication communication device further includes a second common key generation unit that generates a second common key from the second secret key stored in the second secret key storage unit and information that includes a public key of the first authentication device that is included in the first public key certificate that is sent from the first authentication communication device. Here, in subsequent communication, encryption communication is performed using the first common key and the second common key.

Here, the first authentication communication device further includes a first time-variable information generation unit that generates first time-variable information whose output value varies with time; and a first common key generation unit that generates a first common key from the first time-variable value and information that includes a second time-variable value sent from the second authentication communication device. The second authentication communication device further includes a second time-variable information generation unit that generates second time-variable information whose output value varies with time; and a second common key generation unit that generates a first common key from the second time-variable value and information that includes a first time-variable value sent from the first authentication communication device. Here, in subsequent communication, encryption communication is performed using the first common key and the second common key.

Here, the first public key revocation list check unit further, when checking the public key certificate revoked device list, if the identifier of the past opposite party stored in the revoked device identifier storage unit is included in the revoked device list, rewrites the validity distinction information stored in the revoked device identifier storage unit as a set with the identifier of the opposite party, to show revoked.

Here, the first public key revocation list check unit further, when checking the second public key certificate revocation list, if an identifier of a past opposite party stored in the first revocation device identifier storage unit is in the first public key revoked device list, rewrites the first validity distinction information stored as a set with the identifier of the opposite party in the first revoked device identifier storage unit, to show revoked. The second public key revocation list check unit further, when checking the first public key certificate revocation list, if an identifier of a past opposite party stored in the second revocation device identifier storage unit is in the second public key revoked device list, rewrites the second validity distinction information stored as a set with the identifier of the opposite party in the second revoked device identifier storage unit, to show revoked.

Here, the first public key revoked device list and the second public key revoked device list are identical information.

1.9 Effects of the Invention

As has been described, the present invention is an authentication communication system including an authenticating apparatus and a responder that communicate after authentication, the authenticating apparatus being operable to: store, in advance, revocation information that indicates a revoked apparatus; judge, in authenticating the responder, and based on the revocation information, whether or not the responder is revoked; prohibit communication with the responder when the responder is judged to be revoked; and communicate with the responder when the responder is judged not to be revoked; and the responder being operable to communicate with the authenticating apparatus when the responder is not revoked. In addition, the present invention is an authenticating apparatus, for use with a responder, for communicating with the responder after authentication, the authenticating apparatus including: a storage unit operable to store in advance revocation information that indicates a revoked apparatus; a judgement unit operable, in authentication with the responder, to judge, based on the revocation information, whether or not the responder is revoked; and a communication unit operable to prohibit communication with the responder when the responder is judged to be revoked, and communicate with the responder when the responder is judged not to be revoked.

According to the stated structure, the authenticating apparatus stores in advance revocation information that shows at least one revoked apparatus, and judges whether or not the authentication-receiving apparatus is revoked, based on the revocation information. Therefore, it is not necessary for the authenticating apparatus to always store a CRL. As a result, the area for storing information about revoked apparatuses can be made smaller than is conventionally required. Furthermore, since the authenticating apparatus stores in advance revocation information showing at least one revoked apparatus, the authenticating apparatus can recognize a revoked apparatus according to the revocation information, even if the authenticating apparatus obtains an old CRL.

Here, the storage unit may store, as the revocation information, a revoked identifier that corresponds to a revoked apparatus, and in authentication, the judgement unit may judge whether or not the responder is revoked by comparing an apparatus identifier that corresponds to the responder with the revoked identifier, determine that the responder is revoked when the apparatus identifier matches the revoked identifier, and determine that the responder is not revoked when the apparatus identifier does not match the revoked identifier.

According to the stated structure, the authentication apparatus is able to judge whether or not the authentication-receiving apparatus is revoked, by comparing an identifier corresponding to a revoked apparatus and the identifier corresponding to the authentication-receiving apparatus. Therefore, revocation can be judged with certainty.

Here, the revoked identifier may identify a public key certificate that has been revoked and that corresponds to a revoked apparatus, and the judgement unit may compare the revoked identifier with the apparatus identifier that identifies the public key certificate that corresponds to the responder.

According to the stated structure, a revoked public key certificate can be recognized with certainty.

Here, the authenticating apparatus may further include: an obtaining unit operable to obtain a revocation list from a certificate authority apparatus that manages revoked apparatuses, the revocation list including different revocation information that corresponds to a revoked apparatus, wherein in authentication, the judgement unit further judges, based on the different revocation information included in the obtained revocation list, whether or not the responder is revoked, and, when the responder is judged to be revoked, writes to the storage unit apparatus revocation information that indicates that the responder is revoked, and the communication unit further prohibits communication with the responder when the judgement unit judges the responder to be revoked.

According to the stated structure, the authenticating apparatus obtains a revocation list from the certificate authority apparatus, and judges whether or not the authentication-receiving apparatus is revoked, based on the different revocation information included in the obtained revocation list, and writes apparatus revocation information showing that the authentication-receiving apparatus is revoked to the storage unit. Therefore, stored revocation information can be updated based on a new revocation list.

Here, the revocation list obtained by the obtaining unit may include, as the different revocation information, a different revoked identifier that corresponds to a revoked apparatus, and in authentication, the judgement unit may judge whether or not the responder is revoked by comparing the apparatus identifier that corresponds to the responder with the different revoked identifier included in the obtained revocation list, determine that the responder is revoked when the apparatus identifier and the different revoked identifier match, and determine that the responder is not revoked when the apparatus identifier and the different revoked identifier do not match.

According to the stated structure, the authenticating apparatus judges whether or not the authentication-receiving apparatus is revoked, by comparing the identifier included in the revocation list and the apparatus identifier corresponding to the authentication-receiving apparatus. Therefore, revocation can be judged with certainty.

Here, the different revoked identifier may identify a different public key certificate that is revoked and that corresponds to a revoked apparatus, and in authentication, the judgement unit may compare the apparatus identifier that identifies the public key certificate that corresponds to the responder with the different revoked identifier.

According to the stated structure, the revocation list includes a revoked identifier that identifies a revoked public key certificate. Therefore a revoked public key certificate can be recognized with certainty.

Here, the obtaining unit may obtain the revocation list via one of a communication line and a recording medium.

According to the stated structure, the revocation list can be obtained with certainty via a communication path or a recording medium.

Here, the storage unit may store, as the revocation information, an operated identifier generated by applying a first operation to a revoked identifier that corresponds to a revoked apparatus, and in authentication, the judgement unit may apply a second operation to the operated identifier to generate a playback revoked identifier, judge whether or not the responder is revoked by comparing the apparatus identifier that corresponds to the responder with the generated playback revoked identifier, determine that the responder is revoked when the apparatus identifier and the playback revoked identifier match, and determine that the responder is not revoked when the apparatus identifier and the playback revoked identifier do not match. Furthermore, the storage unit may store an operated identifier generated by applying, as the first operation, an encryption operation to the revoked identifier, and the judgement unit may apply, as the second operation, an inverse transform of the encryption to the operated identifier, to generate the playback revoked identifier.

According to the stated structure, the storage unit stores, as the revocation information, an operated identifier generated by applying either a first operation or encryption to a revoked identifier corresponding to a revoked apparatus. Therefore, a third party is unable to discover the revoked identifier either unintentionally or with malicious intention.

Here, the storage unit may further store in advance a first function value generated by applying a unidirectional function to the revocation information, and the judgement unit may further read the first function value from the storage unit, apply the unidirectional function to the revocation information to generate a second function value, compare the read first function value and the generated second function value, perform the judgement of revocation in authentication when the first function value with the second function value match, and prevent usage of the revocation information when the first function value and the second function value do not match. Furthermore, the first function value may be generated by applying, as the unidirectional function, a hash function to the revocation information, and the judgement unit may apply, as the unidirectional function, the hash function to the revocation information to generate the second function value.

According to the stated structure, the authenticating apparatus reads, from the storage unit, the first function value that has been generated by applying a unidirectional function or a hash function to the revocation information, applies the unidirectional function or hash function to the revocation information to generate a second function value, and compares the first function value and the second function value. When the two do not match, the authenticating apparatus prevents use of the revocation information. Accordingly, the authenticating apparatus is able to find out when the revocation information has been tampered with, and prevent use of the revocation information in such a case.

Here, the storage unit may further store in advance validity information indicating a valid apparatus, the judgement unit may further judge, based on the validity information, whether or not the responder is valid, and the communication unit may further communicate with the responder when the responder is judged to be valid.

According to the stated structure, the authenticating apparatus stores in advance validity information showing a valid apparatus, and judges the validity of the authentication-receiving apparatus based on the validity information. Therefore, the authenticating apparatus can easily judge whether an apparatus is valid.

Here, the storage unit may store, as the validity information, a valid identifier that corresponds to a valid apparatus, and in authentication, the judgement unit may judge whether or not the responder is valid by comparing the apparatus identifier that corresponds to the responder and the valid identifier, and determine the responder to be valid when the apparatus identifier and the valid identifier match.

According to the stated structure, the authenticating apparatus compares a valid identifier corresponding to a valid apparatus, an authentication identifier corresponding to the authentication-receiving apparatus, and the valid identifier. Therefore, validity can be judged with certainty.

Here, the valid identifier may identify a public key certificate that corresponds to a valid apparatus, and the judgement unit may compare the valid identifier with the apparatus identifier, the apparatus identifier identifying a public key certificate that corresponds to the responder.

According to the stated structure, the authenticating apparatus is able to recognize a valid public key certificate with certainty.

Here, the authenticating apparatus may be for use with a certificate authority apparatus and may further include: an obtaining unit operable to obtain a revocation list from a certificate authority apparatus that manages revoked apparatuses, the revocation list including different revocation information corresponding to a revoked apparatus, wherein, in authentication, the judgement unit judges, based on the different revocation information included in the obtained revocation list, whether or not the responder is revoked, writes apparatus revocation information to the storage unit when the responder is judged to be revoked, the apparatus revocation information indicating that the responder is revoked, and writes apparatus validity information to the storage unit when the responder is judged not to be revoked, the apparatus validity information indicating that the responder is valid, and the communication unit further prohibits communication with the responder when the responder is judged to be revoked.

According to the stated structure, the authenticating apparatus obtains the revocation list from the certificate authority apparatus, judges whether or not the authentication-receiving apparatus is revoked, based on the different identifier included in the obtained revocation list, and writes either apparatus revocation information or apparatus validity information. Therefore, stored revocation information and validity information can be updated.

Here, the obtained revocation list may include, as the different revocation information, a revoked identifier that corresponds to a revoked apparatus, and in authentication, the judgement unit may judge whether or not the responder is revoked by comparing the apparatus identifier that corresponds to the responder with the revoked identifier included in the obtained revocation list, determine the responder to be revoked when the apparatus identifier matches the revoked identifier, and determine the responder not to be revoked when the apparatus identifier does not match the revoked identifier.

According to the state structure, the authenticating apparatus can judge whether or not the authentication-receiving apparatus is revoked, by comparing the revoked identifier included in the revocation list and the apparatus identifier corresponding to the authentication-receiving apparatus. Therefore, revocation can be judged with certainty.

Here, the judgement unit may further update the valid identifier stored in the storage unit to revoked, when both the valid identifier and the apparatus identifier match and the revoked identifier and the apparatus identifier match.

According to the stated structure, when an apparatus that was valid is subsequently revoked, the valid identifier stored in the storage unit can be updated with certainty to a revoked identifier.

The present invention is suitable for a system in which content that is a digitized work, such as a movie or music, is distributed. A device that transmits content and a device that receives and plays back content confirm that they are both devices that protect copyrights, and only when the confirmation is successful, content is transmitted. In this way, the content can be limited to being used by certain devices, and as a result, the copyrights of the content are protected.

Although the present invention has been fully described by way of examples with reference to the accompanying drawings, it is to be noted that various changes and modifications will be apparent to those skilled in the art. Therefore, unless otherwise such changes depart from the scope of the present invention, they should be construed as being included therein.

What is claimed is:

1. An authentication communication system comprising:
   an authenticating apparatus comprising a microprocessor and a memory; and
   a responder, wherein
   the memory stores a public key and a public key certificate, the public key corresponding to a secret key of the responder, and the public key certificate certifying validness of a public key, and
   the microprocessor of the authenticating apparatus is operable to:
      obtain a revocation list from a non-transitory recording medium on which content and the revocation list are recorded, the revocation list including first revocation information that corresponds to a revoked apparatus that has been revoked by a time of recording the content on the recording medium;
      store, in the memory of the authenticating apparatus, second revocation information including a second revoked identifier assigned to an apparatus which has been judged to be revoked by the authenticating apparatus;
      judge, in a first authentication of the responder, based on the obtained revocation list, whether or not the responder is revoked, the first authentication being performed only once when the responder is judged not to be revoked in a second authentication;
      judge, in the second authentication of the responder, based on the second revocation information, whether or not the responder has been revoked by the authenticating apparatus;
      judge, using the public key certificate, whether or not the public key corresponds to the responder;
      prohibit communication with the responder at least one of when the responder is judged to be revoked in the first authentication, when the responder is judged to be revoked in the second authentication, and when the public key is judged not to correspond to the responder;
      communicate with the responder when the public key is judged to correspond to the responder and the responder has not been judged to be revoked; and
      add, to the second revocation information stored in the memory, an apparatus identifier assigned to the responder, only when the responder is not included in the revocation list and the authenticating apparatus judges that the public key does not correspond to the responder.

2. The authentication communication system of claim 1, wherein
   the authenticating apparatus is operable to
      judge, in the second authentication of the responder, whether or not the responder is revoked by comparing the apparatus identifier assigned to the responder with the second revoked identifier stored in the memory of the authenticating apparatus,
      determine that the responder is revoked when the apparatus identifier matches the second revoked identifier, and
      determine that the responder is not revoked when the apparatus identifier does not match the second revoked identifier.

3. The authentication communication system of claim 1, wherein
   the responder is further operable to
      store a public key and a public key certificate, the public key corresponding to a secret key of the authenticating apparatus, and the public key certificate certifying validness of a public key,
      judge, using the public key certificate, whether or not the public key corresponds to the authenticating apparatus,
      communicate with the authenticating apparatus using the public key when the public key is judged to correspond to the authenticating apparatus, and
      prohibit communication with the authenticating apparatus when the public key is judged not to correspond to the authenticating apparatus.

4. The authentication communication system of claim 1, wherein
   the authenticating apparatus performs the second authentication before the first authentication.

5. An authenticating apparatus, for use with a responder, for communicating with the responder after authentication, the authenticating apparatus comprising:
   a microprocessor; and
   a memory, wherein
   the memory stores second revocation information including a second revoked identifier assigned to an apparatus which has been judged to be revoked by the authenticating apparatus, and also stores a public key and a public key certificate, the public key corresponding to a secret key of the responder, and the public key certificate certifying validness of a public key, and
   the microprocessor operates as:
      an obtaining unit operable to obtain a revocation list from a non-transitory recording medium on with content and the revocation list are recorded, the revocation list including first revocation information that corresponds to a revoked apparatus that has been revoked by a time of recording the content on the recording medium;
      a first judgment unit operable to judge as a first authentication, based on the obtained revocation list, whether or not the responder is revoked, the first authentication being performed only when the responder is judged not to be revoked in a second authentication;
      a second judgment unit operable to judge as the second authentication, based on the second revocation information, whether or not the responder has been revoked by the authenticating apparatus;
      a third judgment unit operable to judge, using the public key certificate, whether or not the public key corresponds to the responder;
      a communication unit operable to prohibit communication with the responder at least one of when the first judgment unit judges that the responder is revoked, when the second judgment unit judges that the responder is revoked, and when the public key is judged not to correspond to the responder, and operable to communicate with responder when the public key is judged to correspond to the responder and the responder has not been judged to be revoked; and a writing unit operable to add, to the second revocation information stored in the memory, an apparatus identifier assigned to the responder, only when the responder is not included in the revocation list and the authenticating apparatus judges that the public key does not correspond to the responder.

6. The authenticating apparatus of claim 5, wherein
in the second authentication, the second judgment unit is operable to judge whether or not the responder is revoked by comparing the apparatus identifier assigned to the responder with the second revoked identifier stored in the memory, determine that the responder is revoked when the apparatus identifier matches the second revoked identifier, and determine that the responder is not revoked when the apparatus identifier does not match the second revoked identifier.

7. The authenticating apparatus of claim 6, wherein
the writing unit is operable to write the second revoked identifier that identifies a public key certificate that has been revoked and that corresponds to the revoked apparatus,
the second revoked identifier stored by the memory identifies a public key certificate that has been revoked and that corresponds to a revoked apparatus, and
the second judgment unit is operable to compare the second revoked identifier with the apparatus identifier that identifies the public key certificate that corresponds to the responder.

8. The authenticating apparatus of claim 5, wherein
the revocation list obtained by the obtaining unit includes, as the first revocation information, a first revoked identifier that corresponds to a revoked apparatus, and
in the first authentication, the first judgment unit is operable to judge whether or not the responder is revoked by comparing the apparatus identifier assigned to the responder with the first revoked identifier included in the obtained revocation list, determine that the responder is revoked when the apparatus identifier and the first revoked identifier match, and determine that the responder is not revoked when the apparatus identifier and the first revoked identifier do not match.

9. The authentication apparatus of claim 8, wherein
the first revoked identifier identifies a different public key certificate that is revoked and that corresponds to a revoked apparatus, and
in the second authentication, the second judgment unit is operable to compare the apparatus identifier that identifies the public key certificate that corresponds to the responder with the first revoked identifier.

10. The authentication apparatus of claim 5, wherein
the memory stores, as the second revocation information, an operated identifier generated by applying a first operation to a revoked identifier that corresponds to a revoked apparatus, and
in the second authentication, the second judgment unit is operable to apply a second operation to the operated identifier to generate a regenerated revoked identifier, judge whether or not the responder is revoked by comparing the apparatus identifier assigned to the responder with the regenerated revoked identifier, determine that the responder is revoked when the apparatus identifier and the regenerated revoked identifier match, and determine that the responder is not revoked when the apparatus identifier and the regenerated revoked identifier do not match.

11. The authentication apparatus of claim 10, wherein
the memory stores an operated identifier generated by applying, as the first operation, an encryption operation to the revoked identifier, and
the second judgment unit is operable to apply, as the second operation, an inverse transform of the encryption operation to the operated identifier, to generate the regenerated revoked identifier.

12. The authenticating apparatus of claim 5, wherein
the memory further stores in advance a first function value generated by applying a unidirectional function to the second revocation information, and
the second judgment unit is further operable to read the first function value from the memory, apply the unidirectional function to the second revocation information to generate a second function value, compare the read first function value and the generated second function value, perform the judgment, based on the second revocation information, when the first function value and the second function value match, and prevent usage of the second revocation information when the first function value and the second function value do not match.

13. The authentication apparatus of claim 12, wherein
the first function value is generated by applying, as the unidirectional function, a hash function to the second revocation information, and
the second judgment unit is operable to apply, as the unidirectional function, the hash function to the second revocation information to generate the second function value.

14. The authentication apparatus of claim 5, wherein
the memory further stores in advance validity information indicating a valid apparatus,
the second judgment unit is further operable to judge, based on the validity information, whether or not the responder is valid, and
the communication unit is further operable to communicate with the responder when the responder is judged to be valid.

15. The authenticating apparatus of claim 14, wherein
the memory stores, as the validity information, a valid identifier which is an apparatus identifier assigned to a valid apparatus, and
in the second authentication, the second judgment unit is operable to judge whether or not the responder is valid by comparing the apparatus identifier assigned to the responder and the valid identifier, and determine the responder to be valid when the apparatus identifier and the valid identifier match.

16. The authentication apparatus of claim 15, wherein
the valid identifier identifies a public key certificate that corresponds to a valid apparatus, and
the second judgment unit is operable to compare the valid identifier with the apparatus identifier, the apparatus identifier identifying a public key certificate that corresponds to the responder.

17. The authentication apparatus of claim 16, wherein the writing unit is operable to write apparatus validity information to the memory when the responder is judged not to be revoked, the apparatus validity information indicating that the responder is valid.

18. The authenticating apparatus of claim 17, wherein
the obtained revocation list includes, as the first revocation information, a first revoked identifier that corresponds to a revoked apparatus, and
in first authentication, the first judgment unit is operable to judge whether or not the responder is revoked by comparing the apparatus identifier assigned to the responder with the first revoked identifier included in the obtained revocation list, determine the responder to be revoked when the apparatus identifier matches the first revoked identifier, and determine the responder not to be revoked when the apparatus identifier does not match the first revoked identifier.

19. The authentication apparatus of claim 18, wherein the first judgment unit is further operable to update the valid identifier stored in the memory to revoked, when both the valid identifier and the apparatus identifier match and the first revoked identifier and the apparatus identifier match.

20. The authenticating apparatus of claim 5, wherein
the second judgment unit performs the second authentication before the first judgment unit performs the first authentication.

21. An authenticating method for an authenticating apparatus that communicates with a responder after authentication, the authenticating apparatus including a microprocessor and a memory, the memory having stored therein second revocation information including a second revoked identifier, the second revocation information being an identifier assigned to an apparatus which has been judged to be revoked by the authenticating apparatus, and memory also storing a public key and a public key certificate, the public key corresponding to a secret key of the responder, and the public key certificate certifying validness of a public key, the authenticating method performed by the microprocessor comprising:
obtaining a revocation list from a non-transitory recording medium on which content and the revocation list are recorded, the revocation list including first revocation information that corresponds to a revoked apparatus that has been revoked by a time of recording the content on the recording medium;
judging, with the microprocessor, as a first authentication, based on the obtained revocation list, whether or not the responder is revoked, the first authentication being performed only once when the responder is judged not to be revoked in a second authentication;
judging, with the microprocessor, as the second authentication, based on the second revocation information, whether or not the responder has been revoked by the authenticating apparatus;
judging, with the microprocessor, using the public key certificate, whether or not the public key corresponds to the responder;
prohibiting communication with the responder at least one of when the judging as the first authentication judges that the responder is revoked, when the judging as the second authentication judges that the responder is revoked, and when the public key is judged not to correspond to the responder, and communicating with the responder when the public key is judged to correspond to the responder and the responder has been judged not to be revoked; and
adding, with the microprocessor, to the second revocation information stored in the memory, an apparatus identifier assigned to the responder, only when the responder is not included in the revocation list and the public key does not correspond to the responder.

22. A non-transitory computer-readable storage medium having an authenticating program recorded thereon for use in a computer that communicates with a responder after authentication, the computer including a microprocessor and memory, the memory having stored therein second revocation information including a second revoked identifier, the second revocation information being an identifier assigned to an apparatus which has been judged to be revoked by the authenticating program, and the memory also storing a public key and a public key certificate, the public key corresponding to a secret key of the responder, and the public key certificate certifying validness of a public key, the authenticating program comprising instructions causing the microprocessor to:
obtain a revocation list from a non-transitory recording medium on which content and the revocation list are recorded, the revocation list including first revocation information that corresponds to a revoked apparatus that has been revoked by a time of recording the content on the recording medium;
judge as a first authentication, based on the obtained revocation list, whether or not the responder is revoked, the first authentication being performed only once when the responder is judged not to be revoked in a second authentication;
judge as the second authentication, based on the second revocation information, whether or not the responder has been revoked by the authenticating apparatus;
judge, using the public key certificate, whether or not the public key corresponds to the responder;
prohibit communication with the responder at least one of when the first authentication judges that the responder is revoked, when the second authentication judges that the responder is revoked, and when the public key is judged not to correspond to the responder, and communicate with the responder when the public key is judged to correspond to the responder and the responder has not been judged to be revoked; and
add, to the second revocation information stored in the memory, an apparatus identifier assigned to the responder, only when the responder is not included in the revocation list and the public key does not correspond to the responder is judged to be revoked in the first authentication.

23. A copyrights protection system comprising:
an authenticating apparatus including a microprocessor and a memory; and
a responder, wherein
the memory stores a public key and a public key certificate, the public key corresponding to a secret key of the responder, and the public key certificate certifying validness of a public key,
a digital work is transferred between the authenticating apparatus and the responder after authentication,
the microprocessor is operable to:
obtain a revocation list from a non-transitory recording medium on which content and the revocation list are recorded, the revocation list including first revocation information that corresponds to a revoked apparatus that has been revoked by a time of recording the content on the recording medium;
judge as a first authentication, based on the obtained revocation list, whether or not the responder is revoked, the first authentication being performed only once when the responder is judged not to be revoked in a second authentication;
judge as the second authentication, based on second revocation information including a second revoked identifier, the second revocation information being an identifier assigned to an apparatus which has been judged to be revoked by the authenticating apparatus, whether or not the responder has been revoked by the authenticating apparatus;

judge, using the public key certificate, whether or not the public key corresponds to the responder;

prohibit communication with the responder at least one of when the first authentication judges that the responder is revoked, when the second authentication judges that the responder is revoked, and when the public key is judged not to correspond to the responder; and perform transfer of the digital work with the responder when the responder is judged not to be revoked;

add, to the second revocation information, an apparatus identifier assigned to the responder, only when the responder is not included in the revocation list and the responder is judged not to correspond to the public key; and the responder is operable to perform transfer of the digital work with the authenticating apparatus when the responder is judged not to be revoked

* * * * *